(12) United States Patent
Gier et al.

(10) Patent No.: US 11,532,167 B2
(45) Date of Patent: Dec. 20, 2022

(54) STATE MACHINE FOR OBSTACLE AVOIDANCE

(71) Applicant: Zoox, Inc., Foster City, CA (US)

(72) Inventors: Max Gier, Aachen (DE); William Anthony Silva, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 471 days.

(21) Appl. No.: 16/671,012

(22) Filed: Oct. 31, 2019

(65) Prior Publication Data

US 2021/0133466 A1 May 6, 2021

(51) Int. Cl.
| | |
|---|---|
| G06V 20/58 | (2022.01) |
| G06F 9/448 | (2018.01) |
| B60W 30/09 | (2012.01) |
| G05D 1/02 | (2020.01) |

(52) U.S. Cl.
CPC ............ *G06V 20/58* (2022.01); *B60W 30/09* (2013.01); *G05D 1/0223* (2013.01); *G06F 9/4498* (2018.02)

(58) Field of Classification Search
None
See application file for complete search history.

(56) References Cited

U.S. PATENT DOCUMENTS

| | | | |
|---|---|---|---|
| 8,712,624 | B1 | 4/2014 | Ferguson et al. |
| 10,146,223 | B1 | 12/2018 | Luders et al. |
| 10,369,990 | B2 | 8/2019 | Gussner et al. |
| 10,931,374 | B1* | 2/2021 | Sleator ............... G05D 1/0231 |
| 11,132,211 | B1* | 9/2021 | Tang .................... B60W 60/00 |
| 2002/0036584 | A1 | 3/2002 | Jocoy et al. |
| 2007/0035416 | A1 | 2/2007 | Tanaka et al. |
| 2008/0012726 | A1 | 1/2008 | Publicover |

(Continued)

FOREIGN PATENT DOCUMENTS

| | | |
|---|---|---|
| EP | 3185233 A1 | 6/2017 |
| WO | WO2013186620 A1 | 12/2013 |

(Continued)

OTHER PUBLICATIONS

PCT Search Report and Written Opinion dated Jun. 9, 2020 for PCT Application No. PCT/US2020/020821, 12 pages.

(Continued)

*Primary Examiner* — Santiago Garcia
(74) *Attorney, Agent, or Firm* — Lee & Hayes, P.C.

(57) ABSTRACT

A vehicle can traverse an environment along a first region and detect an obstacle impeding progress of the vehicle. The vehicle can determine a second region that is adjacent to the first region and associated with a direction of travel opposite the first region. The vehicle can use a state machine to determine an action (e.g., an oncoming action) to utilize the second region to overtake the obstacle. By comparing a cost to a cost threshold and/or to a cost associated with another action (e.g., a "stay in lane" action), the vehicle, using the state machine, can determine a target trajectory that traverses through the second region and can traverse the environment based on the target trajectory to avoid, for example, the obstacle in the environment while maintaining a safe distance from the obstacle and/or other entities in the environment.

20 Claims, 6 Drawing Sheets

(56) References Cited

U.S. PATENT DOCUMENTS

| | | | |
|---|---|---|---|
| 2010/0106356 A1 | 4/2010 | Trepagnier et al. | |
| 2012/0083959 A1* | 4/2012 | Dolgov | G06T 7/521 |
| | | | 701/23 |
| 2015/0175159 A1* | 6/2015 | Gussner | B60W 10/184 |
| | | | 701/1 |
| 2015/0348418 A1* | 12/2015 | Pfeiffer | B60W 50/14 |
| | | | 340/435 |
| 2016/0075332 A1* | 3/2016 | Edo-Ros | B60W 30/0953 |
| | | | 701/70 |
| 2016/0161270 A1* | 6/2016 | Okumura | G08G 1/09675 |
| | | | 701/23 |
| 2016/0318490 A1 | 11/2016 | Ben Shalom | |
| 2017/0057514 A1 | 3/2017 | Toyoda et al. | |
| 2017/0113665 A1 | 4/2017 | Mudalige et al. | |
| 2017/0113683 A1 | 4/2017 | Mudalige et al. | |
| 2017/0132934 A1* | 5/2017 | Kentley | G08G 1/202 |
| 2017/0193384 A1 | 7/2017 | Mudalige et al. | |
| 2017/0262709 A1 | 9/2017 | Wellington et al. | |
| 2017/0368691 A1* | 12/2017 | Li | G05D 1/0221 |
| 2018/0004215 A1* | 1/2018 | Miller | G01C 21/3461 |
| 2018/0074502 A1 | 3/2018 | Holben | |
| 2018/0137762 A1 | 5/2018 | Lee et al. | |
| 2018/0259957 A1 | 9/2018 | Charrow et al. | |
| 2018/0284285 A1 | 10/2018 | Curatu | |
| 2018/0370528 A1 | 12/2018 | Rittger et al. | |
| 2018/0373257 A1* | 12/2018 | Runde | G05D 1/0223 |
| 2019/0009782 A1 | 1/2019 | Kanzawa | |
| 2019/0043353 A1 | 2/2019 | Kim et al. | |
| 2019/0079523 A1 | 3/2019 | Zhu | |
| 2019/0088148 A1* | 3/2019 | Jacobus | G08G 1/096716 |
| 2019/0220016 A1* | 7/2019 | Phillips | B60W 30/12 |
| 2019/0235499 A1* | 8/2019 | Kazemi | G01S 17/931 |
| 2019/0347821 A1 | 11/2019 | Stein | |
| 2019/0354779 A1 | 11/2019 | Zhao et al. | |
| 2019/0384294 A1 | 12/2019 | Shashua et al. | |
| 2019/0384304 A1 | 12/2019 | Towal et al. | |
| 2020/0012286 A1 | 1/2020 | Delp et al. | |
| 2020/0019802 A1 | 1/2020 | Krishnan | |
| 2020/0070826 A1 | 3/2020 | Watanabe | |
| 2020/0180612 A1* | 6/2020 | Finelt | G06V 20/58 |
| 2020/0257317 A1 | 8/2020 | Musk et al. | |
| 2020/0285244 A1* | 9/2020 | Gier | G05D 1/0246 |
| 2020/0346662 A1 | 11/2020 | Suzuki et al. | |
| 2020/0364472 A1* | 11/2020 | Liu | H04W 4/029 |
| 2020/0409386 A1* | 12/2020 | Thakur | G01C 21/3407 |
| 2021/0004613 A1* | 1/2021 | Yang | G06V 10/82 |
| 2021/0016777 A1* | 1/2021 | Weiser | B60W 30/18154 |
| 2021/0108926 A1* | 4/2021 | Tran | G06N 3/04 |
| 2021/0129834 A1* | 5/2021 | Gier | B60W 60/0011 |

FOREIGN PATENT DOCUMENTS

| | | |
|---|---|---|
| WO | WO2016094088 A1 | 6/2016 |
| WO | WO2016094224 A1 | 6/2016 |
| WO | WO2019093190 A1 | 5/2019 |

OTHER PUBLICATIONS

Office Action for U.S. Appl. No. 16/457,197, dated Sep. 1, 2021, Dax, "Dynamic Lane Expansion", 17 pages.

International Preliminary Report on Patentability for PCT Application No. PCT/US20/20821, dated Sep. 16, 2021, 8 pgs.

Office Action for U.S. Appl. No. 16/457,197, dated Dec. 15, 2021, Dax, "Dynamic Lane Expansion", 19 Pages.

Non Final Office Action dated Nov. 3, 2020 for U.S. Appl. No. 16/295,935, "State Machine for Traversing Junctions", Gier, 12 pages.

Campbell et al., "Autonomous Driving in Urban Environments: Approaches, Lessons and Challenges," Philosophical Transaction of The Royal Society, Philosophical Transactions, Oct. 2010, pp. 4649-4672.

General Motors, 2018 Self-Driving Safety Report, 2018, pp. 1-33.

Levinson et al., "Towards Fully Autonomous Driving: Systems and Algorithms," 2011 IEEE Intelligent Vehicles Symposium(IV), Baden-Baden, Germany, Jun. 5-9, 2011, pp. 163-168.

PCT Search Report and Written Opinion dated Feb. 1, 2021 for PCT Application No. PCT/US20/57336, 13 pages.

Office Action for U.S. Appl. No. 16/457,197, dated Mar. 25, 2022, Dax, "Dynamic Lane Expansion", 21 Pages.

* cited by examiner

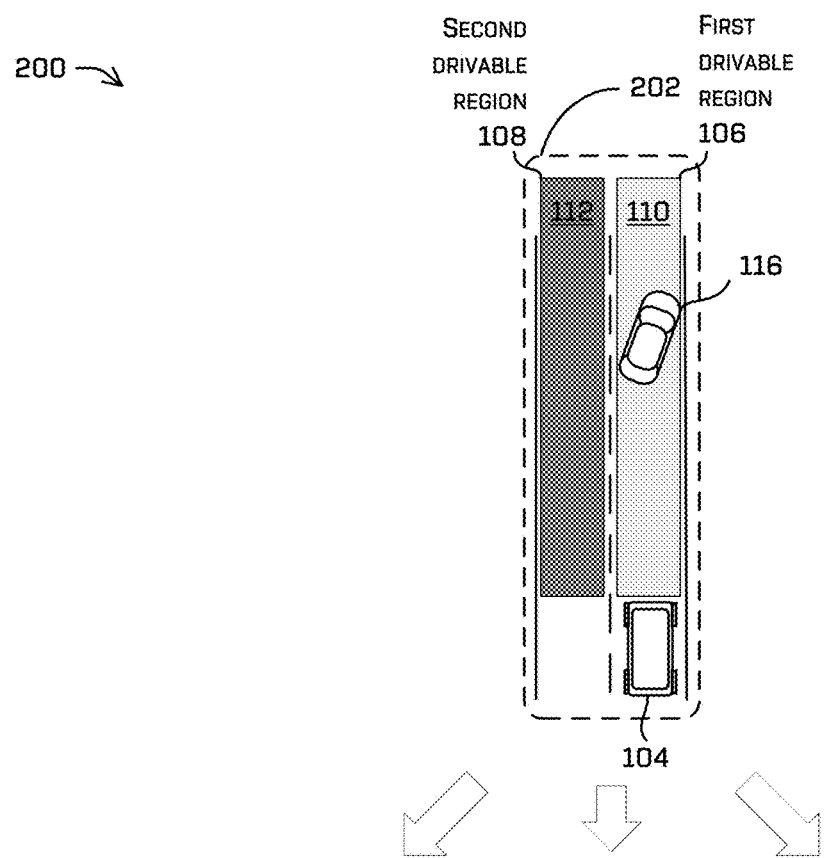
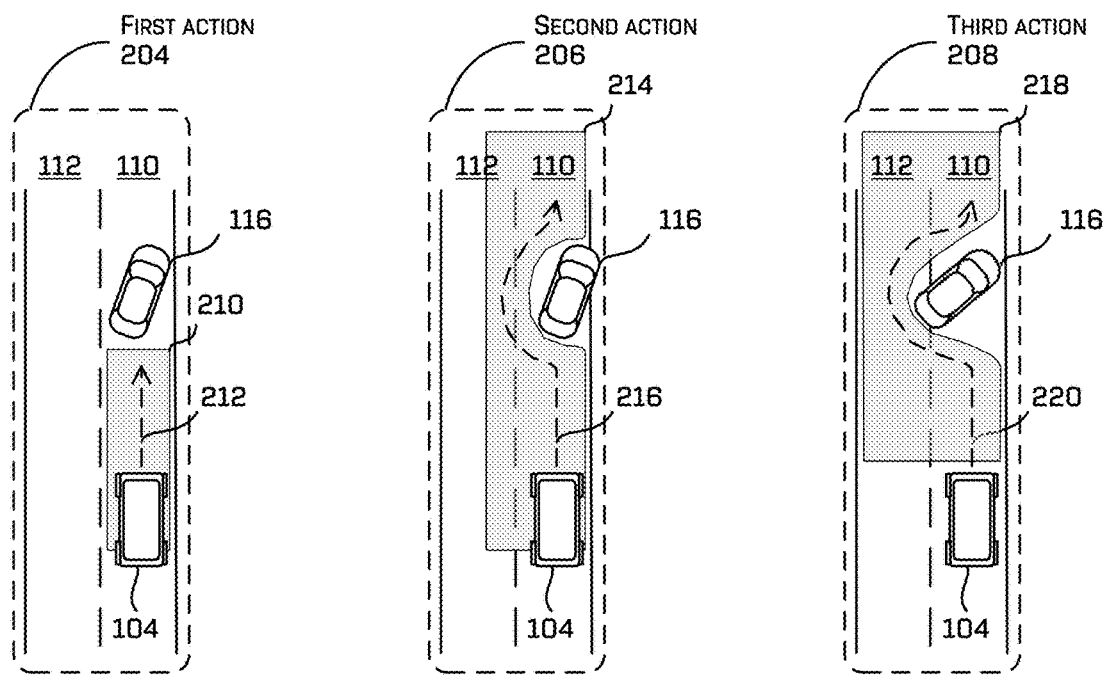
FIG. 2

STATE MACHINE FOR OBSTACLE AVOIDANCE

BACKGROUND

An autonomous vehicle can use various methods, apparatuses, and systems to guide the autonomous vehicle through an environment. For example, an autonomous vehicle can use planning methods, apparatuses, and systems to determine a drive path and guide the autonomous vehicle through the environment that contains dynamic objects (e.g., vehicles, pedestrians, animals, and the like) and static object (e.g., buildings, signage, stalled vehicles, and the like). In some instances, dynamic and/or static objects can act as obstacles that block or slow the autonomous vehicle as it traverses the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 depicts an example of determining multiple actions to traverse through an environment.

DETAILED DESCRIPTION

Figure 1:
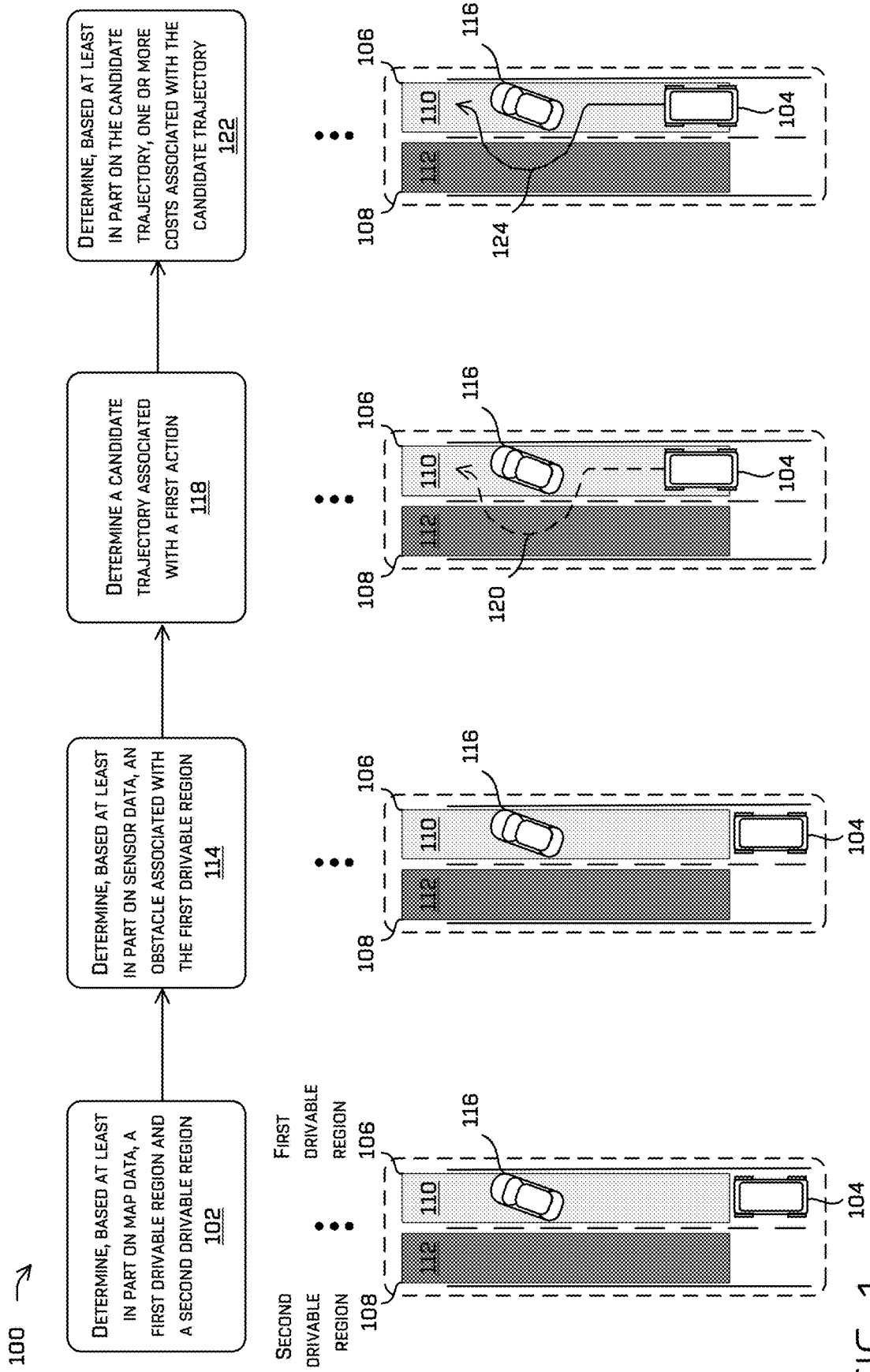
FIG. 1 illustrates a pictorial flow diagram of an example process for determining a target trajectory through a first drivable region and a second drivable region and a cost associated with the target trajectory.

This disclosure describes systems, methods, and apparatuses for determining a target trajectory through a first drivable region and a second drivable region of an environment for an autonomous vehicle to traverse. For example, the autonomous vehicle can traverse an environment while occupying a first drivable region. The first drivable region can be associated with a first direction of travel. As the autonomous vehicle traverses the environment in the first drivable region, the autonomous vehicle can detect an obstacle in the first drivable region. The obstacle can include dynamic objects (e.g., pedestrians, animals, cyclists, trucks, motorcycles, other vehicles, and the like), static objects (e.g., buildings, signage, curbs, debris, and the like), static obstacles (e.g., road markings, physical lane boundaries, road defects, constructions zones, and the like), and/or other objects, which can be known or unknown, and/or the predicted actions of the obstacle (e.g., an estimated trajectory).

The first drivable region can be adjacent to a second drivable region that is associated with a second direction of travel that is different from the first direction of travel. By way of example and without limitation, the second drivable region can be an oncoming traffic lane. The autonomous vehicle can determine one or more actions (e.g., an in-lane action or an oncoming lane action). Based on the action, the autonomous vehicle can determine an updated drivable region associated with the action. For example, the in-lane action can be associated with an updated drivable region that includes the first drivable region. The oncoming lane action can be associated with an updated drivable region that includes the first drivable region and the second drivable region.

In some instances, the autonomous vehicle can determine a candidate trajectory that traverses through the updated drivable region associated with each action. For example, the autonomous vehicle can determine the updated drivable region associated with the oncoming lane action and a candidate trajectory that traverses through the updated drivable region which can traverse from the first drivable region and into the second drivable region. The candidate trajectory can allow the autonomous vehicle to safely pass the obstacle in the first drivable region and return to the first drivable region after passing the obstacle.

The autonomous vehicle can compare costs associated with the one or more actions and determine, based on a candidate trajectory and the costs, a target trajectory for the autonomous vehicle to follow. In some instances, the target trajectory that traverses into the second drivable region can allow the autonomous vehicle to, for example, circumvent obstacles at a lower cost (or more efficiently) when, for example, a lane change action is impractical or unavailable.

The techniques described herein are directed to leveraging sensor and perception data to enable a vehicle, such as an autonomous vehicle, to navigate through an environment while circumventing obstacles in the environment using an update drivable region. Techniques described herein can determine a vehicle action and an update drivable region associated with the action within which a vehicle can travel along a target trajectory relative to those obstacles in an efficient manner. In some examples, determining a target trajectory within an updated drivable region can avoid unnecessary stops and/or delays, which can result in a smoother ride and can improve safety outcomes by, for example, more accurately determining a safe region in which the vehicle can operate to reach an intended destination and operating in a fashion than is consistent with the expectations of other vehicle operators. For example, a planned path such as a reference trajectory can be determined for carrying out a mission. For instance, a mission can be a high-level navigation to a destination, e.g., a series of roads for navigating to the destination. Once the mission is determined, one or more actions for carrying out that high-level navigation can then be determined. In some instances, obstacles can interrupt the one or more actions and determining a target trajectory that allows the vehicle to traverse through an oncoming lane can more efficiently allow the vehicle to navigate around obstacles and make progress toward the mission.

FIG. 1 is a pictorial flow diagram showing an example process 100 to determine a target trajectory and a cost associated with the target trajectory.

At operation 102, a vehicle 104 can determine, based at least in part on map data, a first drivable region 106 and a second drivable region 108. In some instances, the vehicle 104, via a map database, access map data associated with an environment. The vehicle can be configured to use the map data to determine the first drivable region 106 and the second drivable region 108. For example, the map data can indicate that the first drivable region is associated with a first driving lane 110 and that the second drivable region is associated with a second driving lane 112. Additionally, the map data can indicate that the first drivable region 106 is associated with a first direction of travel and that the second drivable region 108 is associated with a second direction of travel that is different from the first direction of travel. In some instances, the map data can include road marker data (e.g., single yellow markers, double yellow markers, single white markers, double white markers, solid markers, broken markers, and the like). The road marker data can indicate whether passing using an oncoming lane is permitted where the vehicle 104 can determine whether to use the oncoming lane based at least in part on the road maker data.

At operation 114, the vehicle 104 can determine, based at least in part on sensor data, an obstacle associated with the first drivable region. For example, the vehicle 104 can capture sensor data of the environment, which can include obstacles such as the object 116. By way of example, without limitation, the object 116 can represent a vehicle that is stalled or otherwise stopped in the first driving lane 110. In some examples, the object 116 may not be physically located within the first driving lane 110, although a region around the object 116 can be defined so as to limit a width of the first drivable region 106. FIG. 1 illustrates the object 116 as occupying a portion of the first drivable region 106 which can reduce a size of the first drivable region 106 and an available amount of space for the vehicle 104 to traverse the environment.

Although the object 116 is illustrated as a stalled vehicle, other types of obstacles are contemplated such as a double-parked vehicle, a parked vehicle that protrudes into the first drivable region 106, debris, signage, a construction zone, a pedestrian, a road defect, and the like.

The vehicle 104 can use sensor data to determine that object 116 is in a location that is in front of the vehicle 104. Additionally, the vehicle 104 can use sensor data and/or map data to determine that the object 116 is in a position that corresponds to a lane occupied by the vehicle 104. By way of example and without limitation, the vehicle 104 can use a perception engine and/or localization algorithms to determine a position of the object 116 and associate the position of the object 116 with a portion of the map data that can include road/lane data associated with the environment to determine that a region occupied by the object 116.

At operation 118, the vehicle 104 can determine a target trajectory associated with a first action. For example, the vehicle 104 can determine a first action which can include an oncoming lane action which can be an action that results in the vehicle 104 traversing from the first drivable region 106 into the second drivable region 108 as represented by a candidate trajectory 120. The oncoming lane action can allow the vehicle 104 to safely pass the object 116 by using the available second drivable region 108.

When determining the action (e.g., the oncoming lane action) and the candidate trajectory 120, the vehicle 104 can use sensor data representing the obstacle to determine contours or boundaries of an updated drivable region. For example, an updated drivable region can be a virtual representation of the environment that can define the constraints and/or boundaries within which the vehicle 104 can safely travel relative to obstacles (e.g., object 116) in the environment to effectively reach an intended destination. In some examples, the updated drivable region is determined by the vehicle and/or by a computing device on a remote computing system, and can be used by the vehicle to traverse the environment. That is, the vehicle can determine trajectories (e.g., candidate trajectory 120) and/or drive paths based on the contours of the updated drivable region. Examples of techniques for determining a drive envelope can be found, for example, in U.S. patent application Ser. No. 15/982,694 titled "Drive Envelope Determination" and filed May 17, 2018 (describing, in part, determining a drivable region (also referred to as a driving envelope) for traversing an environment), which is hereby incorporated by reference, in its entirety.

As discussed above, the vehicle 104 can determine the oncoming lane action and a candidate trajectory 120 for proceeding through the environment to pass the object 116 while traversing in the second drivable region 108. The candidate trajectory 120 can include discrete segments within the updated drivable region according to which the vehicle will travel. Thus, the candidate trajectory 120 can include discrete, shorter segments intended to be carried out by the vehicle to traverse through the environment, within the updated drivable region. Examples of techniques for determining a trajectory within drivable regions can be found, for example, in U.S. patent application Ser. No. 16/179,679 titled "Adaptive Scaling in Trajectory Generation" and filed Nov. 2, 2018, which is hereby incorporated by reference, in its entirety.

In some instances, a reference trajectory representing an initial path or trajectory for the vehicle 104 to follow can be generated or received by the vehicle 104. In some examples, the reference trajectory can correspond to a centerline of a road segment, although the reference trajectory can represent any path in an environment.

At operation 122, the vehicle can determine, based at least in part on the candidate trajectory, one or more costs associated with the candidate trajectory. In some instances, the one or more costs can be associated with points on the reference trajectory. In general, the one or more costs can include, but is not limited to a reference cost, an obstacle cost, a lateral cost, a longitudinal cost, a region cost, a width cost, an indicator cost, an action switch cost, an action cost, a utilization cost, and the like. Examples of types of costs and techniques for determining a cost can be found, for example, in U.S. patent application Ser. No. 16/147,492 titled "Trajectory Generation and Optimization Using Closed-Form Numerical Integration in Route-Relative Coordinates" and filed Sep. 28, 2018, which is hereby incorporated by reference, in its entirety.

For example, as boundaries of the updated drivable region are modified (e.g., using the techniques discussed herein), such costs can vary, which can ultimately change a location of a vehicle in an environment. In an example where an updated drivable region is determined which provides an update drivable region around an obstacle in an environment, the vehicle can plan a trajectory (e.g., the candidate trajectory 120) based on costs determined in part on the updated drivable region.

In some instances, a reference cost can include a cost associated with a difference between a point on the reference trajectory and a corresponding point on the candidate trajectory, whereby the difference represents one or more difference in a yaw, lateral offset, velocity, acceleration, curvature, curvature rate, and the like.

In some instances, an obstacle cost can comprise a cost associated with a distance between a point on the reference trajectory or the candidate trajectory and a point associated with an obstacle in the environment. For example, a point associated with an obstacle can correspond to a point on a boundary of an updated drivable region or can correspond to a point associated with the obstacle in the environment. As discussed above, an obstacle in the environment can include, but is not limited to a static object (e.g., building, curb, sidewalk, lane marking, sign post, traffic light, tree, etc.) or a dynamic object (e.g., a vehicle, bicyclist, pedestrian, animal, etc.). In some instances, a dynamic object can also be referred to as an agent. In some examples, a static object or a dynamic object can be referred to generally as an object or an obstacle.

In some instances, a lateral cost can refer to a cost associated with steering inputs to the vehicle 104, such as maximum steering inputs relative to a velocity of the vehicle 104. In some instances, a longitudinal cost can refer to a cost associated with a velocity and/or acceleration of the vehicle 104 (e.g., maximum braking and/or acceleration).

In some instances, a region cost can refer to a cost associated with a drivable region. For example, a first region cost can be associated with the first drivable region 106 and a second region cost can be associated with the second drivable region 108. By way of example and without limitation, the first region cost can be lower than the second region cost based on a direction of travel of the vehicle and the direction of travel associated with the first drivable region 106 and/or the second drivable region 108. As can be understood, when the direction of travel of the vehicle 104 is the same as the direction of travel of the first drivable region 106 and is different from the direction of travel of the second drivable region 108, the first region cost can be lower than the second region cost.

A width cost can refer to a cost associated with a width of a drivable region. For example, a first width cost can be associated with the first drivable region 106 and a second width cost can be associated with the second drivable region 108. By way of example and without limitation, the first drivable region 106 can have a width of 3 meters and the second drivable region 108 can have a width of 4 meters. The first width cost can be higher than the lower width cost based on the first drivable region 106 having a narrower width than the second drivable region 108 where the second drivable region 108 can allow the vehicle 104 to traverse the second drivable region 108 which can provide more lateral space than the first drivable region 106.

An indicator cost can refer to a cost associated with an amount of time that the vehicle 104 has enabled an indicator (e.g., a turn light). For example, the vehicle 104 can enable an indicator, such as a turn light, that periodically enables and disables a light that can be visible from an exterior of the vehicle 104. The indicator can provide an indicator to individuals in the environment of an intent to perform an action of the vehicle 104 (e.g., a turn action or a lane change action). As the amount of time that the indicator is enabled increases, the indicator cost can decrease.

As discussed above, the one or more costs (e.g., the reference cost, the obstacle cost, the lateral cost, the longitudinal cost, the region cost, the width cost, the indicator cost, the action switch cost, the action cost, the utilization cost, and the like) can be associated with the candidate trajectory. In some instances, the vehicle 104 can compare the cost with a cost threshold. Based on the comparison, the vehicle 104 can determine a target trajectory 124 for the vehicle 104 to follow which, by way of example and without limitation, can be the candidate trajectory 120.

In at least some examples, such a cost may be determined contemporaneously with the candidate trajectory. For instance, a candidate trajectory through a region may be determined as an optimization which minimizes a total cost (e.g., a sum of all component costs as described above). As such, herein, where costs based on trajectories are discussed, such discussion may include those instances in which costs are determined contemporaneously (substantially simultaneously) with such a trajectory. FIG. 2 depicts an example of determining multiple actions to traverse through an environment and updated drivable regions and trajectories associated with the multiple actions.

For example, the vehicle 104 can traverse through an environment 202. Additionally, as discussed above, the vehicle 104 can determine one or more actions represented in the first action 204, the second action 206, and third action 208.

In the first action 204, the vehicle 104 can determine an in-lane action and an updated drivable region 210. The updated drivable region 210 can represent a drivable region that is associated with the in-lane action. For example, the in-lane action can be an action that causes the vehicle 104 to remain in the first driving lane 110 and the updated drivable region 210 can represent the drivable region associated with remaining in the first driving lane 110.

Based at least in part on the updated drivable region 210, the vehicle 104 can determine a candidate trajectory 212 associated with the in-lane action. The candidate trajectory 212 can cause the vehicle 104 to remain in the first drivable region 106 and reduce a speed of the vehicle 104 and/or stop at a location as the vehicle 104 approaches the object 116.

In the second action 206, the vehicle 104 can determine a partial lane expansion action and an updated drivable region 214 that is associated with the partial lane expansion action. For example, the partial lane expansion action can be an action that causes the vehicle 104 to use a portion of the second driving lane 112 to pass the object 116 and the updated drivable region 214 can represent a drivable region that incorporates a portion of the second driving lane 112.

Based at least in part on the updated drivable region 214, the vehicle 104 can determine a candidate trajectory 216 associated with the partial lane expansion action. The candidate trajectory 216 can cause the vehicle 104 to partially traverse into the second driving lane 112 which can allow the vehicle 104 to safely pass the object 116. Examples of techniques for determining a trajectory using lane expansion can be found, for example, in U.S. patent application Ser. No. 16/457,197 titled "Dynamic Lane Expansion" and filed Jun. 28, 2019, which is hereby incorporated by reference, in its entirety.

In the third action 208, the vehicle 104 can determine an oncoming lane action and an updated drivable region 218 that is associated with the oncoming lane action. For example, the oncoming lane action can be an action that causes the vehicle 104 to traverse into the second driving lane 112 (e.g., an oncoming lane) to pass the object 116 and the updated drivable region 218 can represent a drivable region that incorporates the second driving lane 112.

Based at least in part on the updated drivable region 218, the vehicle 104 can determine the candidate trajectory 220 associated with the oncoming lane action to safely pass the object 116.

In some instances, the vehicle can determine the candidate trajectory 212, 216, or 220 as the target trajectory based on conditions in the environment. For example, a lane divider (or lane marker) can indicate a no passing zone where vehicles are not allowed to pass in the oncoming traffic lane. Therefore, based on the lane divider, the vehicle 104 can determine the in-lane action and reduce a velocity of the vehicle 104 and/or come to a stop at a location as the vehicle 104 approaches the object 116.

In some instances, the vehicle 104 can determine the partial lane expansion action and the candidate trajectory 212 as the target trajectory. For example, the vehicle 104 can, based on the map data and/or the sensor data, determine a width required by the vehicle 104 to pass the object 116. The vehicle 104 can determine that the width is less than a width threshold (e.g., a maximum expansion width) associated with the partial lane expansion action. Then the vehicle 104 can determine the candidate trajectory 212 as the target trajectory and proceed to traverse the environment by following the target trajectory to pass the object 116 by partially traversing into the second drivable region 108 as depicted in the second action 206.

In some instances, the vehicle 104 can determine the oncoming lane action and the candidate trajectory 220 as the target trajectory. For example, as discussed above, the vehicle 104, can determine that the width required by the vehicle 104 meets or exceeds the width threshold associated with the partial lane expansion action. Additionally, the vehicle 104 can determine that an available width meets or exceeds an available width threshold. For example, the available width can be associated with a width of an updated drivable region (e.g., drivable regions including oncoming driving lanes and accounting for obstacles in the environment) and the available width threshold can be associated with a width of the vehicle 104 whereby meeting or exceeding the available width threshold can indicate that the vehicle 104 can traverse through the environment without encountering a complete obstruction. Additionally, the vehicle 104 can determine, based on the map data and/or the sensor data, that a lane divider indicates a passing zone where vehicles are allowed to pass in the oncoming traffic lane. Additionally, the vehicle 104 can determine additional driving lane data indicating that an additional driving lane associated with the same direction of travel of the vehicle 104 is not available (e.g., the additional driving lane does not exist or is also obstructed). Therefore, the vehicle 104, based on the width, the lane divider indication, and/or the additional driving lane data, can determine the oncoming lane action and the candidate trajectory 220 as the target trajectory where following the target trajectory can allow the vehicle 104 to pass the object 116 by traversing into the second drivable region 108.

In some instances, the vehicle 104 can determine the oncoming lane action and the candidate trajectory 220 as the target trajectory based on a speed of the object 116. For example, the vehicle 104 can determine a speed associated with the object 116 and compare the speed of the object 116 with a speed threshold. In some instances, the speed threshold can be 0 meters per second which can indicate that the object 116 must be static in order for the vehicle to determine the oncoming lane action and the candidate trajectory 220 as the target trajectory. In some instances, the speed threshold can be greater than 0 (e.g., 0.5 meters per second, 1 meter per second, or any suitable speed threshold) which can indicate, for example, a slow-moving vehicle such as a farm equipment, construction equipment, trucks towing trailers, and the like. The oncoming lane action can allow the vehicle 104 to safely pass the slow-moving vehicle.

In some instances, the vehicle 104 can determine attributes associated with the object 116 to determine the oncoming lane action. By way of example and without limitation, the vehicle 104 can determine attributes such as hazard lights and/or excessive smoke emitted by a tailpipe of the object 116. The attributes can indicate that the object 116 is in need of maintenance or attention and determine the oncoming lane action to safely pass the object 116.

Figure 3:
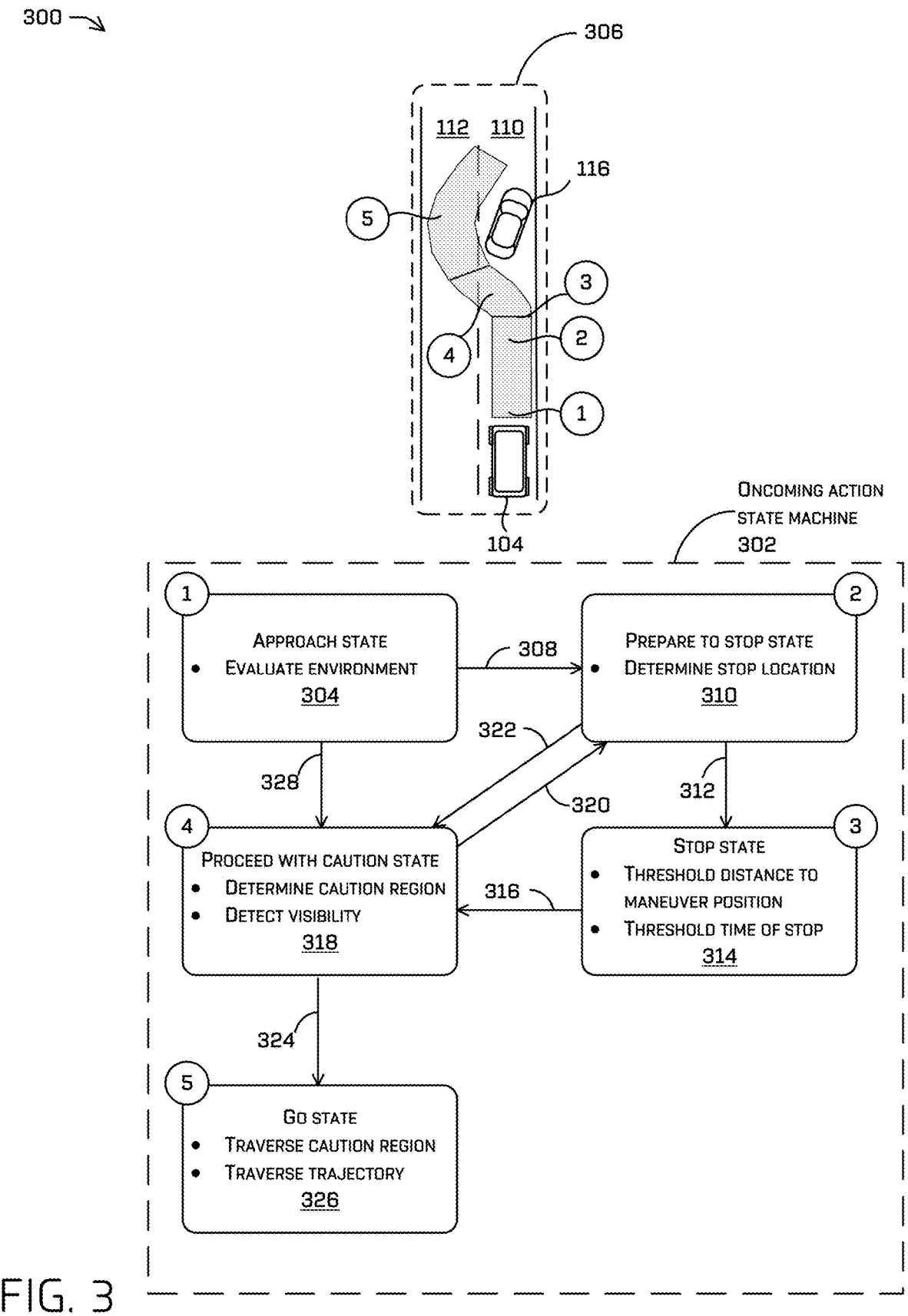
FIG. 3 depicts an example state machine including an approach state, a prepare to stop state, a stop state, a proceed with caution state, and a go state.

FIG. 3 depicts an example state machine (also referred to as a finite state machine) including an approach state, a prepare to stop state (also referred to as a preparation state), a proceed with caution state (also referred to as a caution state), a stop state, and a go state. Of course, such states and connections therebetween are depicted for illustrative purposes only and other state machines are contemplated which comprise greater or fewer states and/or differing connections therebetween. In at least some examples, different state machines may be used for different scenarios and/or maneuvers. Examples of techniques for using a state machine to determine how to traverse an environment can be found, for example, in U.S. patent application Ser. No. 16/295,935 titled "State Machine for Traversing Junctions" and filed Mar. 7, 2019, which is hereby incorporated by reference, in its entirety.

The oncoming action state machine 302 can include an approach state 304. In some examples, the approach state 304 can include evaluating the environment 306 (e.g., by analyzing data collected by one or more sensors) for a variety of objects (e.g., object 116) that may trigger a vehicle to take a particular action. For example, environment 306 illustrates an environment that includes a vehicle 104 traversing on a drivable region associated with a first driving lane 110 approaching an object 116.

The object 116 in this example can be a stalled vehicle. The approach state 304 is denoted with a "1", where the vehicle 104 can be in the approach state. In some instances, sensor data can be captured by the vehicle 104 during the approach state 304, which can be used to determine information about the object 116, including but not limited to, a type of the object (e.g., semantic information indicating a classification of the object, such as a vehicle, pedestrian, bicycle, animal, and the like). In some instances, operations of the oncoming action state machine 302 can include determining the type of the object 116, a bounding box associated with the object 116, segmentation information associated with the object 116, and/or movement information associated with the object 116, and any uncertainties associated therewith, as discussed herein. The vehicle 104 can, via sensors associated with the vehicle 104, determine that the object 116 is a stalled vehicle. Although not explicitly pictured, it can be understood that the vehicle 104 can also detect that the object 116 is other types of objects such as a double-parked vehicle or other types of obstacles such as a road defect, a construction zone, and the like. The approach state 304 can additionally include accessing map data representing the environment.

In some instances, while the vehicle 104 is in the approach state 304, the vehicle 104 can detect additional objects. For example, a different vehicle can be in the oncoming lane (e.g., the second driving lane 112) or a different vehicle can be behind the vehicle 104 with an estimated object trajectory of passing the vehicle 104 on a left side of the vehicle 104. The vehicle 104 can determine whether the vehicle 104 must yield to the different vehicle and/or if the different vehicle will yield to the vehicle 104. Examples of techniques for determining whether an object such as a different vehicle will yield can be found, for example, in U.S. patent application Ser. No. 16/549,704 titled "Yield Behavior Modeling and Prediction" and filed Aug. 23, 2019, which is hereby incorporated by reference, in its entirety.

In response to determining that the vehicle 104 will have to yield, the vehicle 104 can determine a yield trajectory to perform a transition 308 from the approach state 304 to a prepare to stop state 310. The prepare to stop state 310 can include determining a stop position where the vehicle 104 should come to a stop. In some examples and as discussed above, one or more other vehicles or objects may be ahead of the vehicle 104 approaching the vehicle 104 in the second driving lane 112, which can be identified by sensors of the vehicle 104. The vehicle 104 can determine a stop position to that meets or exceeds a threshold distance from the object 116 and/or other objects in the environment that is in front of the vehicle 104.

Once the stop position is determined, the vehicle 104 can traverse through the environment to stop at the stop position, and in doing so can perform a transition 312 from the prepare to stop state 310 to a stop state 314 when the vehicle 104 is completely stopped. The stop state 314 is denoted with a "3".

While in the stop state 314, the vehicle 104 can determine whether the vehicle 104 is within a threshold distance of a maneuver position, corresponding to a lane change maneuver associated with the oncoming lane action. The vehicle 104 can compare a current position of the vehicle 104 in the stop state 314 to a position suitable for making a lane change ("maneuver position"). For example, if the vehicle 104 is too close to the object 116, performing a lane change into the second driving lane 112 can be difficult due to the limited amount of space available whereas the maneuver position can allow the vehicle 104 to perform a lane change into the second driving lane 112.

If the vehicle 104 determines that the vehicle 104 no longer has to yield (e.g., the different vehicle has cleared allowing the vehicle 104 to proceed forward), the vehicle 104 can perform a transition 316 from the stop state 314 to the proceed with caution state 318 denoted with a "4". In the proceed with proceed with caution state 318, the vehicle 104 begins to creep into a "caution region" indicated by the "4". The caution region can provide the vehicle 104 with enough distance between a body of the vehicle 104 and a boundary associated with a drivable region of the second driving lane 112 that if the vehicle 104 were to stop in the caution region, the other vehicles would be able to safely avoid a collision with the vehicle 104 while traversing in the second driving lane 112. When approaching the caution region, the vehicle 104 can proceed from the stop of the stop state 314 at a transition speed that is dependent upon an amount of visibility (e.g., an occluded region and/or an occlusion grid can reduce an amount of visibility where an occluded region can be a region of the environment that has limited visibility from the vehicle 104) and a distance to the caution region. For example, further distance from the caution region and more visibility may result in a faster transition speed to approach the caution region, while shorter distance to the caution region and less visibility may result in a slower transition speed to approach the caution region.

To determine a size and/or dimension of the caution region, the vehicle 104 can take into account the geometry of the region at which the vehicle 104 has stopped, in addition to other factors to perform the maneuver. For example, the vehicle 104 can determine a desired arc length from beginning the lane change into the second driving lane 112 and back into the first driving lane 110 after passing the object 116. Therefore, the desired arc length corresponds to a projected path of travel of the vehicle 104 from the stop position to being merged into the first driving lane 110. The desired arc length defines at least a first portion of the caution region for the vehicle 104 in making the lane change maneuver.

The vehicle 104 can also use the arc length to determine a time to execute the maneuver, taking into consideration accelerating from stop (or the transition speed at which the vehicle is approaching the caution region) to reaching a desired speed (e.g., the speed limit of the first driving lane 110 and/or the second driving lane 112). The time determined to execute the maneuver may then be used to determine an amount of desired visible distance that the vehicle 104 can sense before executing the maneuver. The vehicle 104 can detect visibility of the second driving lane 112 by evaluating sensor data from sensors of the vehicle 104, and determine whether there is sufficient visibility to perform the lane change maneuver.

The vehicle 104 can use the information generated in the proceed with caution state 318 to then determine a transition speed to traverse the caution region. Several factors can contribute to determining a transition speed, such as an amount of determined visibility (e.g., more visibility weighs in favor of higher transition speed while lower visibility weighs in favor of lower transition speed), an estimated time to execute the lane change maneuver (e.g., a longer execution time weighs in favor of lower transition speed while a shorter execution time weighs in favor of higher transition speed), and so on. The vehicle 104 can use the determined transition speed to control the vehicle 104 to proceed through the caution region in the proceed with proceed with caution state 318, continuing to evaluate sensor data of the surrounding environment throughout the caution region.

If an oncoming vehicle is detected while the vehicle 104 is in the caution region, the vehicle 104 can yield to the oncoming vehicle by performing a transition 320 from the proceed with caution state 318 back to the prepare to stop state 310. Once the vehicle 104 has yielded to the oncoming vehicle and the oncoming vehicle has cleared, the vehicle 104 can continue through the caution region at the transition speed (which may not be constant throughout the maneuver) by performing a transition 322 from the prepare to stop state 310 to the proceed with caution state 318. However, if the vehicle 104 passes a threshold point within the caution region, the vehicle 104 can perform a transition 324 from the proceed with caution state 318 to a go state 326. The go state 326 is denoted with a "5", in which a representation of the vehicle 104 has completed the lane change into the second driving lane 112 has entered the oncoming lane.

In some instances, if the vehicle 104, while in the approach state 304, determines that the vehicle 104 does not have to yield (e.g., there are no other vehicles and/or objects in the region allowing the vehicle 104 to proceed forward), the vehicle 104 can perform a transition 328 from the approach state 304 to the proceed with caution state 318 denoted with a "4". As discussed above, in the proceed with proceed with caution state 318, the vehicle 104 begins to creep into a "caution region" indicated by the "4". A creep of the vehicle 104 can be, for example, the vehicle 104 proceeding forward at or below a speed threshold while monitoring conditions of the environment. By way of example and without limitation, the speed threshold can be 3 meters per second where a speed of the vehicle 104 can be less than or equal to the speed threshold to allow the vehicle 104 to monitor the environment for objects, pedestrians, vehicles, and the like while allowing the vehicle 104 to stop within a short period of time. The caution region can provide the vehicle 104 with enough distance between a body of the vehicle 104 and a boundary associated with a drivable region of the second driving lane 112 that if the vehicle 104 were to stop in the caution region, the other vehicles would be able to safely avoid a collision with the vehicle 104 while traversing in the second driving lane 112. When approaching the caution region of the, the vehicle 104 can proceed at a transition speed that is dependent upon an amount of visibility and a distance to the caution region. For example, further distance from the caution region and more visibility may result in a faster transition speed to approach the caution region, while shorter distance to the caution region and less visibility may result in a slower transition speed to approach the caution region.

In some instances, the vehicle 104 as discussed above can determine that the vehicle 104 does not have to yield (e.g., there are no other vehicles and/or objects in the region allowing the vehicle 104 to proceed forward) while in the approach state 304. Based on determining that the vehicle 104 does not have to yield, the vehicle 104 can perform a transition from the approach state 304 to the go state 326. This can allow the vehicle 104 to bypass the proceed with caution state 318 based on determining that it would be able to safely pass the object 116.

Figure 4A:
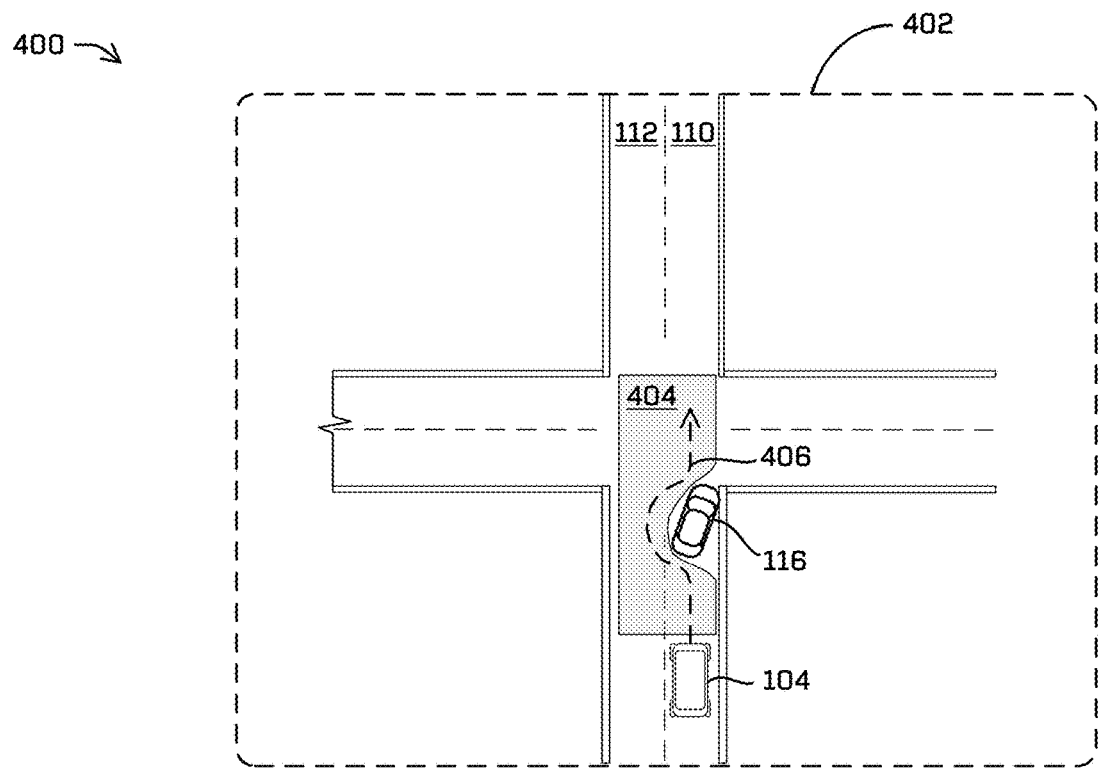
FIGS. 4A and 4B depict examples of determining an updated region through a junction.
Figure 4B:
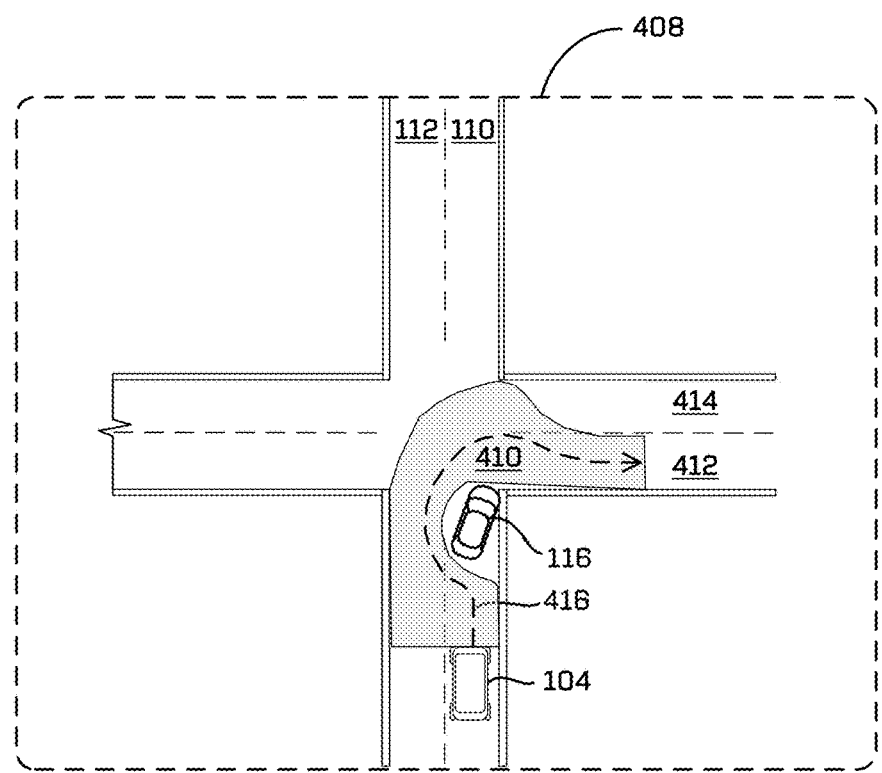

FIGS. 4A and 4B depict examples of determining an updated region through a junction.

In FIG. 4A, the environment 402 depicts a vehicle 104 traversing through the environment 402 and detecting an object 116 which can be, for example, a stalled vehicle. As discussed above, the vehicle 104 can determine an oncoming lane action and determine an updated drivable region 404 that includes the second driving lane 112 (e.g., the oncoming lane). Based on the updated drivable region 404, the vehicle 104 can determine a target trajectory 406 that traverses through the updated drivable region 404. While traversing through the junction, the vehicle 104 can continue to monitor and/or detect other vehicles and/or object with estimated trajectories that lead toward the updated drivable region 404 and the vehicle 104 can use the oncoming action state machine (also referred to as a finite state machine) described in FIG. 3 to proceed safely through the junction.

Similarly, in FIG. 4B, the environment 408 depicts a vehicle 104 traversing through the environment 408 and detecting an object 116. As discussed above, the vehicle 104 can determine an oncoming lane action and determine an updated drivable region 410 that includes the second driving lane 112 (e.g., the oncoming lane). In contrast with environment 402, however, a target lane for the vehicle 104 is the third driving lane 412 which, by way of example and without limitation, is perpendicular to a current direction of travel and intersects the current driving lane (e.g., the first driving lane 110). The vehicle 104 can determine the updated drivable region 410 which can first include a portion of the second driving lane 112 in order to pass the object 116 as well as a portion of the fourth driving lane 414. In some instances, the updated drivable region 410 can omit the portion that includes the fourth driving lane 414. In some instances, the contours of the updated drivable region 410 can depend on a capability of the vehicle 104 such as a turning radius. Based on the updated drivable region 410, the vehicle 104 can determine a target trajectory 416 that traverses through the updated drivable region 410.

Figure 5:
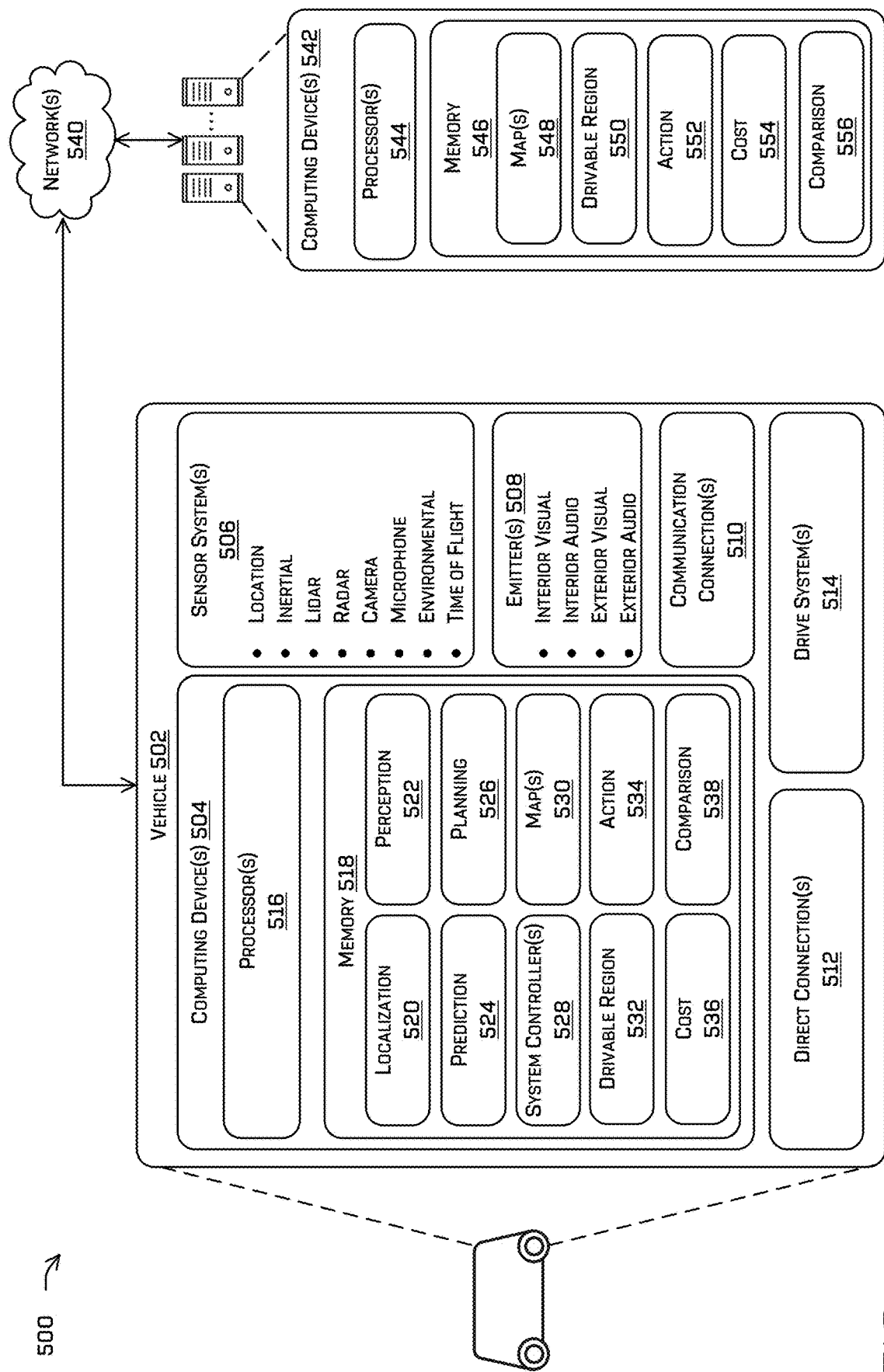
FIG. 5 depicts a block diagram illustrating an example computing system for determining a target trajectory through a first drivable region and a second drivable region.

FIG. 5 is a block diagram illustrating an example system 500 for determining an updated drivable region and determining a target trajectory to pass an obstacle. In at least one example, system 500 can include a vehicle 502, which can be the same or similar to the vehicle 104 described above with reference to FIGS. 1-4B.

By way of example and without limitation, the vehicle 502 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 104 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 502 are described throughout this disclosure.

The vehicle 502 can be any configuration of vehicle, such as, for example, a van, a sport utility vehicle, a cross-over vehicle, a truck, a bus, an agricultural vehicle, and/or a construction vehicle. The vehicle 502 can be powered by one or more internal combustion engines, one or more electric motors, hydrogen power, any combination thereof, and/or any other suitable power sources. Although the vehicle 502 has four wheels, the systems and methods described herein can be incorporated into vehicles having fewer or a greater number of wheels, and/or tires. The vehicle 502 can have four-wheel steering and can operate generally with equal or similar performance characteristics in all directions, for example, such that a first end of the vehicle 502 is the front end of the vehicle 502 when traveling in a first direction, and such that the first end becomes the rear end of the vehicle 502 when traveling in the opposite direction. Similarly, a second end of the vehicle 502 is the front end of the vehicle when traveling in the second direction, and such that the second end becomes the rear end of the vehicle 502 when traveling in the opposite direction. These example characteristics can facilitate greater maneuverability, for example, in small spaces or crowded environments, such as parking lots and/or urban areas.

The vehicle 502 can include computing device(s) 504, sensor system(s) 506, emitter(s) 508, communication connection(s) 510, direct connection(s) 512, and drive system(s) 514.

The vehicle computing device(s) 504 can include processor(s) 516 and memory 518 communicatively coupled with processor(s) 516. In the illustrated example, vehicle 502 can be an autonomous vehicle. However, vehicle 502 could be any other type of vehicle. In the illustrated example, memory 518 of vehicle computing device(s) 504 can store a localization system 520, a perception system 522, a prediction system 524, a planning system 526, system controller(s) 528, a map(s) system 530, a drivable region system 532, an action system 534, a cost system 536, and a comparison system 538. Although these systems and components are illustrated, and described below, as separate components for ease of understanding, functionality of the various systems and controllers can be attributed differently than discussed. By way of example and without limitation, functionality attributed to perception system 522 can be carried out by localization system 520 and/or prediction system 524. Moreover, fewer or more systems and components can be used to perform the various functionalities described herein. Furthermore, though depicted in FIG. 5 as residing in memory 518 for illustrative purposes, it is contemplated that localization system 520, perception system 522, prediction system 524, planning system 526, system controller(s) system 528, map(s) system 530, drivable region system 532, action system 534, cost system 536, and/or comparison system 538 can additionally, or alternatively, be accessible to vehicle 502 (e.g., stored on, or otherwise accessible by, memory remote from vehicle 502).

In at least one example, localization system 520 can include functionality to receive data from sensor system(s) 506 to determine a position and/or orientation of vehicle 502 (e.g., one or more of an x-, y-, z-position, roll, pitch, or yaw).

For example, localization system 520 can include and/or request/receive a map of an environment (e.g., from map(s) system 530) and can continuously determine a location and/or orientation of the autonomous vehicle within the map. In some instances, localization system 520 can use SLAM (simultaneous localization and mapping), CLAMS (calibration, localization and mapping, simultaneously), relative SLAM, bundle adjustment, non-linear least squares optimization, differential dynamic programming, or the like to receive image data, LIDAR data, RADAR data, IMU data, GPS data, wheel encoder data, and the like to accurately determine a location of the autonomous vehicle. In some instances, localization system 520 can provide data to various components of vehicle 502 to determine an initial position of an autonomous vehicle for generating a trajectory for travelling in the environment.

In some instances, perception system 522 can include functionality to perform object detection, segmentation, and/or classification. In some examples, perception system 522 can provide processed sensor data that indicates a presence of an object that is proximate to vehicle 502, such as objects 116. The perception system can also include a classification of the entity as an entity type (e.g., car, pedestrian, cyclist, animal, building, tree, road surface, curb, sidewalk, unknown, etc.). For instance, perception system 522 can compare sensor data to object information in comparison system 538 to determine the classification. In additional and/or alternative examples, perception system 522 can provide processed sensor data that indicates one or more characteristics associated with a detected object and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), a bounding box associated with the object, etc. Characteristics associated with the environment can include, but are not limited to, a presence of another object in the environment, a state of another object in the environment, a time of day, a day of a week, a season, a weather condition, an indication of darkness/light, etc.

Prediction system 524 can access sensor data from sensor system(s) 506, map data from map system 530, and, in some examples, perception data output from perception system 522 (e.g., processed sensor data). In at least one example, prediction system 524 can determine features associated with the object based at least in part on the sensor data, the map data, and/or the perception data. As described above, features can include an extent of an object (e.g., height, weight, length, etc.), a pose of an object (e.g., x-coordinate, y-coordinate, z-coordinate, pitch, roll, yaw), a velocity of an object, an acceleration of an object, and a direction of travel of an object (e.g., a heading). Moreover, prediction system 524 can be configured to determine a distance between an object and a proximate driving lane, a width of a current driving lane, proximity to a crosswalk, semantic feature(s), interactive feature(s), etc.

Prediction system 524 can analyze features of objects to predict future actions of the objects (e.g., an estimated trajectory of an object). For instance, prediction system 524 can predict lane changes, decelerations, accelerations, turns, changes of direction, or the like. Examples of techniques for determining features of objects can be found, for example, in U.S. patent application Ser. No. 15/982,658 titled "Vehicle Lighting State Determination" and filed May 17, 2018 (describing, in part, determining a state of an object such as a parked vehicle, a double-parked vehicle, a stalled vehicle, and/or a slow-moving vehicle), which is hereby incorporated by reference, in its entirety. The prediction system 524 can send prediction data to drivable region system 532 so that drivable region system 532 can use the prediction data to determine the boundaries of the drivable region (e.g., based on one or more of an uncertainty in position, velocity, acceleration in addition to, or alternatively, with a semantic classification of the object). For instance, if the prediction data indicates that a pedestrian walking along the shoulder is behaving erratically, drivable region system 532 can determine an increased offset of the drivable region proximate the pedestrian. In some examples where vehicle 502 is not autonomous, prediction system 524 can provide an indication (e.g., an audio and/or visual alert) to a driver of a predicted event that can affect travel.

In some examples, prediction system 524 can include functionality to determine predicted point(s) representing predicted location(s) of an object in the environment. Prediction system 524, in some implementations, can determine a predicted point associated with a heat map based at least in part on a cell associated with a highest probability and/or based at least in part on cost(s) associated with generating a predicted trajectory (also referred to as an estimated trajectory) associated with the predicted point.

For example, prediction system 524 can select a point, cell, or region of a heat map as a predicted point based at least in part on evaluating one or more cost functions associated with risk factors, safety, and vehicle dynamics, just to name a few examples. Such costs can include, but are not limited to, a positional-based cost (e.g., limiting the distance allowed between predicted points), a velocity cost (e.g., a constant velocity cost enforcing a constant velocity through the predicted trajectory), an acceleration cost (e.g., enforcing acceleration bounds throughout the predicted trajectory), an expectation that the object can follow rules of the road, and the like. In at least some examples, the probability associated with the cell can be multiplied with the cost (which, in at least some examples, can be normalized) such that the point (e.g., a candidate point) associated with the highest value of the cost times probability is selected as the predicted point associated with an object at a particular time.

In general, planning system 526 can determine a path for vehicle 502 to follow to traverse through an environment. For example, planning system 526 can determine various routes and trajectories and various levels of detail. For example, planning system 526 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, planning system 526 can generate an instruction for guiding the autonomous vehicle along at least a portion of the route from the first location to the second location. In at least one example, planning system 526 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for vehicle 502 to navigate. Thus, in example implementations described herein, planning system 526 can generate trajectories along which the vehicle can navigate, with the trajectories being contained within the drivable region.

The system controller(s) 528, can be configured to control steering, propulsion, braking, safety, emitters, communication, and other systems of vehicle 502. These system controller(s) 528 can communicate with and/or control corresponding systems of drive system(s) 514 and/or other components of vehicle 502. For example, system controllers 528 can cause the vehicle to traverse along a drive path determined by planning system 526, e.g., in a drivable region determined by the drivable region system 532.

The map system 530 can be configured to store one or more maps as map data. A map can be any number of data structures modeled in two dimensions or three dimensions that can provide information about an environment, such as, but not limited to, topologies (such as intersections), streets, mountain ranges, roads, terrain, and the environment in general. In some instances, the map data can indicate the contours of drivable regions in an environment as well as identify types of drivable regions. For example, the map data can indicate portions of an environment that are associated with a driving lane, a bus lane, a two-way left-turn lane, a bicycle lane, sidewalks, etc. as well as a direction of travel associated with the portions of the environment when applicable.

The drivable region system 532 can be configured to determine a drivable region, such as drivable regions 106, 108, 210, 214, 218, 404, and 410. For example, the drivable region can represent an area of an environment that is free of obstacles and corresponds to regions where the vehicle 502 can traverse. In some instances, after determining drivable regions, the drivable region system 532 can further determine updated drivable regions as discussed above. Although illustrated as a separate block in memory 518, in some examples and implementations, the drivable region system 532 can be a part of the planning system 526. Drivable region system 532 can access sensor data from sensor system(s) 506, map data from map system 530, object information from comparison system 538, outputs from one or more of the localization system 520, the perception system 522, and/or the prediction system 524 (e.g., processed data).

By way of non-limiting example, drivable region system 532 can access (e.g., retrieve or receive) one or more planned paths. The planned paths can represent potential paths to navigate the environment, and can be determined based on map data, object information, and/or perception data, for example. In some examples, the planned paths can be determined as candidate paths for carrying out a mission. For instance, computing device(s) 504, can define or determine a mission as a highest-level of navigation to a destination, e.g., a series of roads for navigating to the destination. Once the mission is determined, one or more actions for carrying out that high-level navigation can then be determined.

The action system 534 can be used to determine actions of how to carry out the mission. For example, actions can include tasks such as "follow vehicle," "pass vehicle on the right," "slow down," "stop," "stay in lane," "oncoming lane," "lane change," and the like. In some examples, the projected paths described herein can be determined for each action. For example, a stay in lane action can be used to stay in a current driving lane of the vehicle 502 and an oncoming lane action can be used to use at least a portion of an oncoming lane as drivable region to traverse around an obstacle. Although illustrated as a separate block in memory 518, in some examples and implementations, the action system 534 can be a part of the planning system 526. The action system 534 can access sensor data from sensor system(s) 506 and/or map data from map system 530. In some instances, the action system 534 can, using the sensor data and/or the map data, to determine the actions of the vehicle 502.

For the planned path(s), drivable region system 532 can determine, at discrete points along the planned path(s), lateral distances from the path to objects in the environment. For example, the distances can be received as perception data generated by perception system 522, and/or can be determined using mathematical and/or computer vision models, such as ray casting techniques. Various lateral distances can then be adjusted to account for other factors. For example, it may be desirable to maintain a minimum distance between vehicle 502 and objects in the environment. In some implementations, information about the objects, including semantic classifications, can be used to determine those distance adjustments.

Moreover, prediction system 524 can also provide prediction data about a predicted movement of the objects, and the distances can further be adjusted based on those predictions. For example, the prediction data can include a confidence score and the lateral distance can be adjusted based on the confidence score, e.g., by making a greater adjustment for less confident predictions and slighter or no adjustments for more confident predictions. Using the adjusted distances, drivable region system 532 can define boundaries of the drivable region. In at least some examples, the boundaries can be discretized (e.g., every 10 cm, 50 cm, 1 m, etc.) and information regarding the boundary can be encoded (e.g., lateral distance to the nearest object, semantic classification of the nearest object, confidence and/or probability score associated with the boundary, etc.). As described herein, the trajectory determined by planning system 526 can be confined by, and in accordance with, in the drivable region. While drivable region system 532 is illustrated as being separate from planning system 526, one or more of the functionalities of drivable region system 532 can be carried out by planning system 526. In some embodiments, drivable region system 532 can be a part of planning system 526.

The cost system 536 can be configured to determine one or more costs associated with an action. For example, one or more costs can be associated with a planned path (e.g., a candidate trajectory) through a drivable region that is associated with an action. The one or more costs can include, but is not limited to a reference cost, an obstacle cost, a lateral cost, a longitudinal cost, a region cost, a width cost, an indicator cost, an action switch cost, an action cost, a utilization cost, and the like.

The comparison system 538 can be configured to compare the costs associated with a first candidate trajectory and a second candidate trajectory. For example, a first candidate trajectory can be associated with a stay in lane action where the first candidate trajectory would bring the vehicle 502 to a stop before an obstacle in an environment. A second candidate trajectory can be associated with an incoming lane action where the second candidate trajectory would allow the vehicle 502 to pass the obstacle using an oncoming lane. The cost system 536 can determine the costs associated with the first candidate trajectory and the second candidate trajectory. By way of example and without limitation, the comparison system 538 can determine that the second candidate trajectory is associated with a cost that is below the cost that is associated with the first candidate trajectory and the planning system 526 can use the second candidate trajectory as the target trajectory for traversing through the environment. In some instances, the comparison system 538 can compare the cost associated with a candidate trajectory with a cost threshold. For example, the cost threshold can be used to maintain a current action if the cost associated with a candidate trajectory does not fall below the cost threshold.

In at least one example, the localization system 520, the perception system 522, the prediction system 524, the planning system 526, the drivable region system 532, the action system 534, and/or the cost system 536 can process sensor data and/or map data, as described above, and can send their respective outputs over network(s) 540, to computing device(s) 542. In at least one example, the localization system 520, the perception system 522, the prediction system 524, the planning system 526, the drivable region system 532, the action system 534, and/or the cost system 536 can send their respective outputs to computing device(s) 542 at a particular frequency, after a lapse of a predetermined period of time, in near real-time, etc.

In at least one example, sensor system(s) 506 can include time-of-flight sensors, lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. sensor system(s) 506 can include multiple instances of each of these or other types of sensors. For instance, the lidar sensors can include individual lidar sensors located at the corners, front, back, sides, and/or top of vehicle 502. As another example, the camera sensors can include multiple cameras disposed at various locations about the exterior and/or interior of vehicle 502. sensor system(s) 506 can provide input to computing device(s) 504. Additionally, and/or alternatively, sensor system(s) 506 can send sensor data, via network(s) 540, to computing device(s) 542 at a particular frequency, after a lapse of a predetermined period of time, in near real-time, etc.

The vehicle 502 can also include emitter(s) 508 for emitting light and/or sound. The emitter(s) 508 in this example include interior audio and visual emitters to communicate with passengers of vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, emitter(s) 508 can be disposed at various locations about the exterior and/or interior of vehicle 502.

The vehicle 502 can also include communication connection(s) 510 that enable communication between vehicle 502 and other local or remote computing device(s). For instance, communication connection(s) 510 can facilitate communication with other local computing device(s) on vehicle 502 and/or drive system(s) 514. Also, communication connection(s) 510 can allow the vehicle to communicate with other nearby computing device(s) (e.g., other nearby vehicles, traffic signals, etc.). The communications connection(s) 510 also enable vehicle 502 to communicate with a remote tele-operations computing device or other remote services.

The communications connection(s) 510 can include physical and/or logical interfaces for connecting vehicle computing device(s) 504 to another computing device or a network, such as network(s) 540. For example, communications connection(s) 510 can enable Wi-Fi-based communication such as via frequencies defined by the IEEE 802.11 standards, short range wireless frequencies such as BLUETOOTH, or any suitable wired or wireless communications protocol that enables the respective computing device to interface with the other computing device(s).

In at least one example, vehicle 502 can include drive system(s) 514. In some examples, vehicle 502 can have a single drive system 514. In at least one example, if vehicle 502 has multiple drive systems 514, individual drive systems 514 can be positioned on opposite ends of vehicle 502 (e.g., the front and the rear, etc.). In at least one example, drive system(s) 514 can include sensor system(s) to detect conditions of drive system(s) 514 and/or surroundings of vehicle 502. By way of example and not limitation, sensor system(s) 506 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, time-of-flight sensors, etc. Some sensors, such as the wheel encoder(s) can be unique to drive system(s) 514. In some cases, the sensor system(s) 506 on drive system(s) 514 can overlap or supplement corresponding systems of vehicle 502 (e.g., sensor system(s) 506).

The drive system(s) 514 can include many of the vehicle systems, including a high voltage battery, a motor to propel vehicle 502, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, drive system(s) 514 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of drive system(s) 514. Furthermore, drive system(s) 514 also include communication connection(s) that enable communication by the respective drive module with other local or remote computing device(s).

As described above, vehicle 502 can send sensor data to computing device(s) 542 via network(s) 540. In some examples, vehicle 502 can send raw sensor data to computing device(s) 542. In other examples, vehicle 502 can send processed sensor data and/or representations of sensor data to computing device(s) 542 (e.g., data output from localization system 520, perception system 522, prediction system 524, and/or planning system 526). In some examples, vehicle 502 can send sensor data to computing device(s) 542 at a particular frequency after a lapse of a predetermined period of time, in near real-time, etc.

Computing device(s) 542 can receive sensor data (raw or processed) from vehicle 502 and/or one or more other vehicles and/or data collection devices and can determine an expanded drivable region based on the sensor data and other information. In at least one example, computing device(s) 542 can include processor(s) 544 and memory 546 communicatively coupled with processor(s) 544. In the illustrated example, memory 546 of computing device(s) 542 stores a map(s) system 548, a drivable region system 550, an action system 552, a cost system 554, and a comparison system 556, for example. In at least one example, the map(s) system 548 can correspond to the map(s) system 530, the drivable region system 550 can correspond to the drivable region system 532, the action system 552 can correspond to the action system 534, the cost system 554 can correspond to the cost system 536, and the comparison system 556 can correspond to the comparison system 538.

Processor(s) 516 of vehicle 502 and processor(s) 544 of computing device(s) 542 can be any suitable processor capable of executing instructions to process data and perform operations as described herein. By way of example and not limitation, processor(s) 516 and 544 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memories 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of vehicle 502 can be associated with computing device(s) 542 and/or components of computing device(s) 542 can be associated with vehicle 502. That is, vehicle 502 can perform one or more of the functions associated with computing device(s) 542, and vice versa. Moreover, although various systems and components are illustrated as being discrete systems, the illustrations are examples only, and more or fewer discrete systems can perform the various functions described herein.

In some instances, aspects of some or all of the components discussed herein can include any models, algorithms, and/or machine learning algorithms. For example, in some instances, the components in the memory 518 and 546 can be implemented as a neural network.

Figure 6:
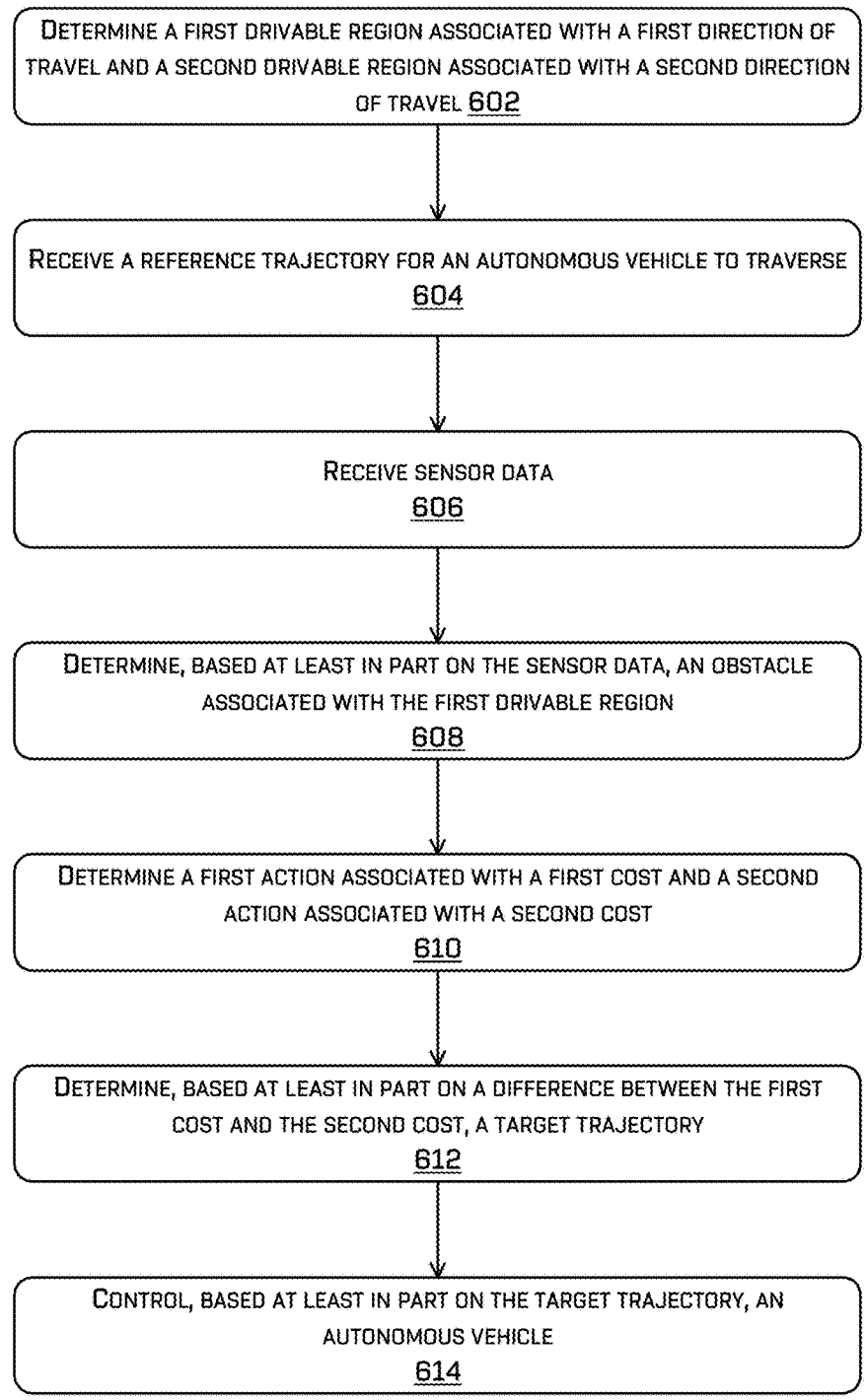
FIG. 6 depicts an example process for determining a target trajectory through a first drivable region and a second drivable region.

FIG. 6 depicts an example process 600 for determining a target trajectory and controlling an autonomous vehicle based at least in part on the target trajectory.

At operation 602, a computing device can determine a first drivable region associated with a first direction of travel and a second drivable region associated with a second direction of travel. For example, a drivable region can represent a region in the environment that can define the constraints and/or boundaries within which a vehicle can safely travel to effectively reach an intended destination. In some instances, a drivable region can represent a region in the environment that can define the constraints and/or boundaries within which a vehicle can safely travel relative to objects in the environment.

At operation 604, the computing device can determine a reference trajectory for an autonomous vehicle to traverse. In some instances, the reference trajectory can be associated with a planned path to carry out a mission.

At operation 606, the computing device can receive sensor data. The sensor data can be data generated by sensors such as time-of-flight sensors, lidar sensors, radar sensors, ultrasonic transducers, sonar sensors, cameras (e.g., RGB, UV, IR, intensity, depth, etc.), microphones, environment sensors (e.g., temperature sensors, humidity sensors, light sensors, pressure sensors, etc.), and the like.

At operation 608, the computing device can determine, based at least in part on the sensor data, an obstacle associated with the first drivable region. The obstacle can be dynamic objects (e.g., pedestrians, animals, cyclists, trucks, motorcycles, other vehicles, and the like), static objects (e.g., buildings, signage, curbs, debris, and the like), static obstacles (e.g., road markings, physical lane boundaries, road defects, constructions zones, and the like), and/or other objects, which can be known or unknown. Additionally, the obstacle can be associated with the first drivable region which can be a current lane of the vehicle 502 that the vehicle 502 is using to traverse the environment. In some instances, the obstacle can interrupt one or more actions associated with carrying out a mission (e.g., high-level navigation) where navigating around the obstacle can allow the vehicle 502 to make progress toward the mission.

At operation 610, the computing device can determine a first action associated with a first cost and a second action associated with a second cost. By way of example and without limitation, the first action can be a stay in lane action and the second action can be an oncoming lane action. The first action can be associated with a first cost and the second action can be associated with a second cost where the first cost and the second cost can include costs such as a reference cost, an obstacle cost, a lateral cost, a longitudinal cost, a region cost, a width cost, an indicator cost, an action switch cost, an action cost, a utilization cost, and the like.

At operation 612, the computing device can determine, based at least in part on a difference between the first cost and the second cost, a target trajectory. The target trajectory can be a trajectory that allows the autonomous vehicle to pass the obstacle by using the oncoming driving lane.

At operation 614, the computing device of an autonomous vehicle can control the autonomous vehicle based at least in part on the target trajectory. As discussed above, the autonomous vehicle can use the oncoming driving lane to circumvent objects that can interfere with a trajectory of the autonomous vehicle.

The various techniques described herein can be implemented in the context of computer-executable instructions or software, such as program modules, that are stored in computer-readable storage and executed by the processor(s)

of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: A system comprising: one or more processors; and one or more computer-readable media storing computer-executable instructions that, when executed, cause the system to perform operations comprising: receiving map data associated with an environment; determining, based at least in part on the map data, a first drivable region of the environment, the first drivable region associated with a first direction of travel; determining, based at least in part on the map data, a second drivable region adjacent to the first drivable region, the second drivable region associated with a second direction of travel different from the first direction of travel; receiving a reference trajectory for an autonomous vehicle to traverse the environment; receiving, from a sensor of the autonomous vehicle, sensor data representing the environment; determining, based at least in part on the sensor data, an obstacle associated with the first drivable region; determining, based at least in part on the obstacle, a first action associated with a first cost and a second action associated with a second cost; determining, based at least in part on a difference between the first cost and the second cost, a target trajectory that traverses through at least a portion of the second drivable region; and controlling, based at least in part on the target trajectory, the autonomous vehicle.

B: The system of paragraph A, the operations further comprising: determining, based at least in part on the sensor data, an initial drivable region associated with the first drivable region; and determining, based at least in part on the sensor data, an updated drivable region comprising the initial drivable region and the portion of the second drivable region; wherein determining the target trajectory is further based at least in part on the updated drivable region.

C: The system of paragraph A, the operations further comprising: determining, based at least in part on the target trajectory and the sensor data, an occluded region; and determining, based at least in part on the occluded region, a speed associated with the target trajectory.

D: The system of paragraph A, the operations further comprising: determining a speed associated with the obstacle; and determining that the speed is less than or equal to a speed threshold; wherein the obstacle is associated with at least one of: a vehicle; a pedestrian; a road defect; or a construction zone.

E: A method comprising: receiving sensor data from a sensor associated with a vehicle; determining a first region of an environment, the first region associated with a first direction of travel; determining a second region adjacent to the first region, the second region associated with a second direction of travel different from the first direction of travel; determining, based at least in part on the sensor data, an obstacle associated with the first region; determining a target trajectory that traverses through the second region and passing the obstacle in the second region, the target trajectory associated with a cost associated; and controlling, based at least in part on the cost and the target trajectory, the vehicle.

F: The method of paragraph E, further comprising: determining, based at least in part on the sensor data, an initial drivable region associated with the first region; and determining, based at least in part on the sensor data, an updated drivable region comprising the initial drivable region and a portion of the second region; wherein determining the target trajectory is further based at least in part on the updated drivable region.

G: The method of paragraph E, wherein the cost is a first cost, the method further comprising: determining a second cost associated with a first alternate trajectory passing through the first region and a third cost associated with a second alternate trajectory associated with the second region; wherein the third cost is greater than the second cost.

H: The method of paragraph E, further comprising: determining, based at least in part on the target trajectory and the sensor data, an occluded region; and determining, based at least in part on the occluded region, a speed associated with the target trajectory.

I: The method of paragraph H, wherein the occluded region is a first occluded region, the method further comprising: determining a first speed of the vehicle associated with the first occluded region; and determining a second occluded region and a second speed associated with the second occluded region.

J: The method of paragraph E, wherein the cost comprises at least one of: a region cost associated with the vehicle occupying the second region, the region cost based at least in part on the second direction of travel being different from the first direction of travel; a width cost associated with a width of the second region; an indicator cost associated with a first amount of time that an indicator light of the vehicle has been enabled; an action switch cost associated with one of initiating an action associated with traversing into the second region or terminating the action; an action cost associated with initiating the action; or a utilization cost associated with a second amount of time that the vehicle has occupied the first region, the utilization cost based at least in part on determining the target trajectory.

K: The method of paragraph E, further comprising: determining, based at least in part on the sensor data, an object in the environment; determining, based at least in part on the sensor data, an estimated trajectory associated with the object; and determining, based at least in part on the estimated trajectory, the target trajectory.

L: The method of paragraph K, further comprising: determining a region width associated with the second region; and determining an object attribute associated with the object, the object attribute comprising at least one of an object width or an object classification; wherein determining the target trajectory is further based at least in part on the region width and the object attribute.

M: A non-transitory computer-readable medium storing instructions executable by a processor, wherein the instructions, when executed, cause the processor to perform operations comprising: receiving sensor data from a sensor associated with a vehicle; determining, based at least in part on the sensor data, an obstacle associated with a first region in an environment, the first region associated with a first direction of travel; determining a target trajectory that traverses through a second region adjacent the first region, the second region associated with a second direction of travel opposite the first direction; determining a cost associated with the target trajectory, the target trajectory associated with passing the obstacle by traversing in the second region; and controlling, based at least in part on the cost and the target trajectory, the vehicle.

N: The non-transitory computer-readable medium of paragraph M, the operations further comprising: determining, based at least in part on the sensor data, an initial drivable region associated with the first region; and determining, based at least in part on the sensor data, an updated drivable region comprising the initial drivable region and a portion of the second region; wherein determining the target trajectory is further based at least in part on the updated drivable region.

O: The non-transitory computer-readable medium of paragraph M, wherein the cost is a first cost, the operations further comprising: determining a second cost associated with an alternate trajectory of passing the obstacle in the first region; wherein the second cost is greater than the first cost.

P: The non-transitory computer-readable medium of paragraph M, the operations further comprising: determining, based at least in part on the target trajectory and the sensor data, an occluded region; and determining, based at least in part on the occluded region, a speed associated with the target trajectory.

Q: The non-transitory computer-readable medium of paragraph P, wherein the occluded region is a first occluded region, the operations further comprising: determining a first speed of the vehicle associated with the first occluded region; and determining a second occluded region and a second speed associated with the second occluded region.

R: The non-transitory computer-readable medium of paragraph M, wherein the cost comprises at least one of: a region cost associated with the vehicle occupying the second region, the region cost based at least in part on the second direction of travel being different from the first direction of travel; a width cost associated with a width of the second region; an indicator cost associated with a first amount of time that an indicator light of the vehicle has been enabled; an action switch cost associated with one of initiating an action associated with traversing into the second region or terminating the action; or a utilization cost associated with a second amount of time that the vehicle has occupied the first region, the utilization cost based at least in part on determining the target trajectory.

S: The non-transitory computer-readable medium of paragraph M, the operations further comprising: determining, based at least in part on the sensor data, an object in the environment; determining, based at least in part on the sensor data, an estimated trajectory associated with the object; and determining, based at least in part on the estimated trajectory, the target trajectory.

T: The non-transitory computer-readable medium of paragraph S, the operations further comprising: determining a region width associated with the second region; and determining an object attribute associated with the object, the object attribute comprising at least one of an object width or an object classification; wherein determining the target trajectory is further based at least in part on the region width and the object attribute.

U: A system comprising: one or more processors; and one or more computer-readable media storing computer-executable instructions that, when executed, cause the system to perform operations comprising: determining a state in which an autonomous vehicle is operating, the state comprising one or more of: a first state comprising a nominal operating state of the autonomous vehicle in which the autonomous vehicle is commanded according to a trajectory, a second state in which the autonomous vehicle is preparing to stop at a stop location, a third state in which the autonomous vehicle is within a threshold distance to the stop location or has been stopped at the stop location for a period of time that meets or exceeds a threshold amount of time, a fourth state in which the autonomous vehicle is proceeding below a threshold speed and within a threshold lateral distance of the trajectory, and a fifth state in which the autonomous vehicle is commanded according to an alternate trajectory to traverse through a region of an environment associated with a direction of traffic opposite the alternate trajectory; and controlling the autonomous vehicle based at least in part on the state.

V: The system of paragraph U, wherein determining the state comprises evaluating a finite state machine.

W: The system of paragraph U, wherein the state comprises the first state and wherein the operations further comprise: receiving sensor data from a sensor associated with the autonomous vehicle; determining, based at least in part on the sensor data, at least one of: an obstacle in the environment that is blocking the trajectory of the autonomous vehicle; or a cost associated with the obstacle and the trajectory, wherein the cost meets or exceeds a threshold cost; and based at least in part on one or more of the obstacle, a speed of the autonomous vehicle, or the sensor data, causing the autonomous vehicle to transition from the first state to one or more of the second state or the fourth state.

X: The system of paragraph U, wherein the state comprises the third state, the operations further comprising: determining a distance between a location of the autonomous vehicle and the stop location; determining the period of time associated with the autonomous vehicle being stopped; and causing, based at least in part on one or more of the distance being less than or equal to the threshold distance or the period of time being greater than or equal to the threshold amount of time, the autonomous vehicle to transition from the third state to the fourth state.

Y: The system of paragraph U, wherein the state comprises the fourth state, the operations further comprising: receiving sensor data from a sensor associated with the autonomous vehicle; determining, based at least in part on the sensor data and the sensor, a level of visibility; and causing, based at least in part on the level of visibility, the autonomous vehicle to transition from the fourth state to the fifth state.

Z: A method comprising: determining a state in which a vehicle is operating, the state comprising one or more of: a first state comprising a nominal operating state of the vehicle in which the vehicle is commanded according to a trajectory, a second state in which the vehicle is preparing to stop at a stop location, a third state in which the vehicle is within a threshold distance to the stop location or has been stopped at a threshold location for a period of time that meets or exceeds a threshold amount of time, a fourth state in which the vehicle is proceeding below a threshold speed and within a threshold lateral distance of the trajectory, and a fifth state in which the vehicle is commanded according to an alternate trajectory to traverse through a region of an environment associated with a direction of traffic opposite the alternate trajectory; and controlling the vehicle based at least in part on vehicle state.

AA: The method of paragraph Z, wherein determining the state comprises evaluating a finite state machine.

AB: The method of paragraph Z, wherein the state comprises the first state and wherein the method further comprises: receiving sensor data from a sensor associated with the vehicle; determining, based at least in part on the sensor data, at least one of: an obstacle in the environment that is blocking the trajectory of the vehicle; or a cost associated with the obstacle and the trajectory, wherein the cost meets or exceeds a threshold cost; and based at least in part on one or more of the obstacle, a speed of the vehicle, or the sensor data, causing the vehicle to transition from the first state to one or more of the second state or the fourth state.

AC: The method of paragraph Z, wherein the state comprises the third state, the method further comprising: determining a distance between a location of the vehicle and the stop location; determining the period of time associated with the vehicle being stopped; and causing, based at least in part on one or more of the distance being less than or equal to the threshold distance or the period of time being greater than or equal to the threshold amount of time, the vehicle to transition from the third state to the fourth state.

AD: The method of paragraph Z, wherein the state comprises the fourth state, the method further comprising: receiving sensor data from a sensor associated with the vehicle; determining, based at least in part on the sensor data and the sensor, a level of visibility; and causing, based at least in part on the level of visibility, the vehicle to transition from the fourth state to the fifth state.

AE: The method of paragraph Z, wherein the state comprises the fourth state, the method further comprising: receiving sensor data from a sensor associated with the vehicle; determining, based at least in part on the sensor data, an obstacle in the environment that is blocking the trajectory of the vehicle; and causing, based at least in part on the obstacle, the vehicle to transition from the fourth state to the second state.

AF: The method of paragraph Z, wherein the state comprises the second state, the method further comprising: determining, based at least in part on an obstacle in the environment that is blocking the trajectory of the vehicle, the stop location; receiving sensor data from a sensor associated with the vehicle; and causing, based at least in part on the sensor data, the vehicle to transition from the second state to one or more of the third state or the fourth state.

AG: A non-transitory computer-readable medium storing instructions executable by one or more processors, wherein the instructions, when executed, cause the one or more processors to perform operations comprising: determining a state in which a vehicle is operating, the state comprising one or more of: a first state comprising a nominal operating state of the vehicle in which the vehicle is commanded according to a trajectory, a second state in which the vehicle is preparing to stop at a stop location, a third state in which the vehicle is within a threshold distance to the stop location or has been stopped at a threshold location for a period of time that meets or exceeds a threshold amount of time, a fourth state in which the vehicle is proceeding below a threshold speed and within a threshold lateral distance of the trajectory, and a fifth state in which the vehicle is commanded according to an alternate trajectory to traverse through a region of an environment associated with a direction of traffic opposite the alternate trajectory; and controlling the vehicle based at least in part on vehicle state.

AH: The non-transitory computer-readable medium of paragraph AG, wherein determining the state comprises evaluating a finite state machine.

AI: The non-transitory computer-readable medium of paragraph AG, wherein the state comprises the first state, the operations further comprising: receiving sensor data from a sensor associated with the vehicle; determining, based at least in part on the sensor data, at least one of: an obstacle in the environment that is blocking the trajectory of the vehicle; or a cost associated with the obstacle and the trajectory, wherein the cost meets or exceeds a threshold cost; and based at least in part on one or more of the obstacle, a speed of the vehicle, or the sensor data, causing the vehicle to transition from the first state to one or more of the second state or the fourth state.

AJ: The non-transitory computer-readable medium of paragraph AG, wherein the state comprises the third state, the operations further comprising: determining a distance between a location of the vehicle and the stop location; determining the period of time associated with the vehicle being stopped; and causing, based at least in part on one or more of the distance being less than or equal to the threshold distance or the period of time being greater than or equal to the threshold amount of time, the vehicle to transition from the third state to the fourth state.

AK: The non-transitory computer-readable medium of paragraph AH, wherein the state comprises the fourth state, the operations further comprising: receiving sensor data from a sensor associated with the vehicle; determining, based at least in part on the sensor data and the sensor, a level of visibility; and causing, based at least in part on the level of visibility, the vehicle to transition from the fourth state to the fifth state.

AL: The non-transitory computer-readable medium of paragraph AG, wherein the state comprises the fourth state, the operations further comprising: receiving sensor data from a sensor associated with the vehicle; determining, based at least in part on the sensor data, an obstacle in the environment which is blocking the trajectory of the vehicle; and causing, based at least in part on the obstacle, the vehicle to transition from the fourth state to the second state.

AM: The non-transitory computer-readable medium of paragraph AG, wherein the state comprises the second state, the operations further comprising: determining, based at least in part on an obstacle in the environment that is blocking the trajectory of the vehicle, the stop location; and causing, based at least in part on the stop location, the vehicle to transition from the second state to the third state.

AN: The non-transitory computer-readable medium of paragraph AG, wherein the state comprises the second state, the operations further comprising: determining, based at least in part on an obstacle in the environment that is blocking the trajectory of the vehicle, the stop location; receiving sensor data from a sensor associated with the vehicle; determining, based at least in part on the sensor data, that a distance between an object and the vehicle meets or exceeds a distance threshold; and causing the vehicle to transition from the second state to the fourth state.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
    one or more processors; and
    one or more non-transitory computer-readable media storing computer-executable instructions that, when executed, cause the system to perform operations comprising:
        determining a state in which an autonomous vehicle is operating, the state comprising one or more of:
            a first state comprising a nominal operating state of the autonomous vehicle in which the autonomous vehicle is commanded according to a trajectory,
            a second state in which the autonomous vehicle is preparing to stop at a stop location,
            a third state in which the autonomous vehicle is within a threshold distance to the stop location or has been stopped at the stop location for a period of time that meets or exceeds a threshold amount of time,
            a fourth state in which the autonomous vehicle is proceeding below a threshold speed and within a threshold lateral distance of the trajectory, or
            a fifth state in which the autonomous vehicle is commanded according to an alternate trajectory to traverse through a region of an environment associated with a direction of traffic opposite the alternate trajectory;
        determining a transition from the state to a new state in accordance with a state diagram, the state diagram enumerating allowed transitions between the first state, the second state, the third state, the fourth state, and the fifth state; and
        controlling the autonomous vehicle based at least in part on the new state.

2. The system of claim 1, wherein determining the state comprises evaluating a finite state machine.

3. The system of claim 1, wherein the state comprises the first state and wherein the operations further comprise:
    receiving sensor data from a sensor associated with the autonomous vehicle;
    determining, based at least in part on the sensor data, at least one of:
        an obstacle in the environment that is blocking the trajectory of the autonomous vehicle; or
        a cost associated with the obstacle and the trajectory, wherein the cost meets or exceeds a threshold cost; and
    based at least in part on one or more of the obstacle, a speed of the autonomous vehicle, or the sensor data, causing the autonomous vehicle to transition from the first state to one or more of the second state or the fourth state.

4. The system of claim 1, wherein the state comprises the third state, the operations further comprising:
    determining a distance between a location of the autonomous vehicle and the stop location;
    determining the period of time associated with the autonomous vehicle being stopped; and
    causing, based at least in part on one or more of the distance being less than or equal to the threshold distance or the period of time being greater than or equal to the threshold amount of time, the autonomous vehicle to transition from the third state to the fourth state.

5. The system of claim 1, wherein the state comprises the fourth state, the operations further comprising:
    receiving sensor data from a sensor associated with the autonomous vehicle;
    determining, based at least in part on the sensor data and the sensor, a level of visibility; and
    causing, based at least in part on the level of visibility, the autonomous vehicle to transition from the fourth state to the fifth state.

6. A method comprising:
    determining a state in which a vehicle is operating, the state comprising one or more of:
        a first state comprising a nominal operating state of the vehicle in which the vehicle is commanded according to a trajectory,
        a second state in which the vehicle is preparing to stop at a stop location,
        a third state in which the vehicle is within a threshold distance to the stop location or has been stopped at a threshold location for a period of time that meets or exceeds a threshold amount of time,
        a fourth state in which the vehicle is proceeding below a threshold speed and within a threshold lateral distance of the trajectory, or
        a fifth state in which the vehicle is commanded according to an alternate trajectory to traverse through a region of an environment associated with a direction of traffic opposite the alternate trajectory;
    determining a transition from the state to a new state in accordance with a state diagram, the state diagram enumerating allowed transitions between the first state, the second state, the third state, the fourth state, and the fifth state; and
    controlling the vehicle based at least in part on the new state.

7. The method of claim 6, wherein determining the state comprises evaluating a finite state machine.

8. The method of claim 6, wherein the state comprises the first state and wherein the method further comprises:
receiving sensor data from a sensor associated with the vehicle;
determining, based at least in part on the sensor data, at least one of:
an obstacle in the environment that is blocking the trajectory of the vehicle; or
a cost associated with the obstacle and the trajectory, wherein the cost meets or exceeds a threshold cost; and
based at least in part on one or more of the obstacle, a speed of the vehicle, or the sensor data, causing the vehicle to transition from the first state to one or more of the second state or the fourth state.

9. The method of claim 6, wherein the state comprises the third state, the method further comprising:
determining a distance between a location of the vehicle and the stop location;
determining the period of time associated with the vehicle being stopped; and
causing, based at least in part on one or more of the distance being less than or equal to the threshold distance or the period of time being greater than or equal to the threshold amount of time, the vehicle to transition from the third state to the fourth state.

10. The method of claim 6, wherein the state comprises the fourth state, the method further comprising:
receiving sensor data from a sensor associated with the vehicle;
determining, based at least in part on the sensor data and the sensor, a level of visibility; and
causing, based at least in part on the level of visibility, the vehicle to transition from the fourth state to the fifth state.

11. The method of claim 6, wherein the state comprises the fourth state, the method further comprising:
receiving sensor data from a sensor associated with the vehicle;
determining, based at least in part on the sensor data, an obstacle in the environment that is blocking the trajectory of the vehicle; and
causing, based at least in part on the obstacle, the vehicle to transition from the fourth state to the second state.

12. The method of claim 6, wherein the state comprises the second state, the method further comprising:
determining, based at least in part on an obstacle in the environment that is blocking the trajectory of the vehicle, the stop location;
receiving sensor data from a sensor associated with the vehicle; and
causing, based at least in part on the sensor data, the vehicle to transition from the second state to one or more of the third state or the fourth state.

13. A non-transitory computer-readable medium storing instructions executable by one or more processors, wherein the instructions, when executed, cause the one or more processors to perform operations comprising:
determining a state in which a vehicle is operating, the state comprising one or more of:
a first state comprising a nominal operating state of the vehicle in which the vehicle is commanded according to a trajectory,
a second state in which the vehicle is preparing to stop at a stop location,
a third state in which the vehicle is within a threshold distance to the stop location or has been stopped at a threshold location for a period of time that meets or exceeds a threshold amount of time,
a fourth state in which the vehicle is proceeding below a threshold speed and within a threshold lateral distance of the trajectory, or
a fifth state in which the vehicle is commanded according to an alternate trajectory to traverse through a region of an environment associated with a direction of traffic opposite the alternate trajectory;
determining a transition from the state to a new state in accordance with a state diagram, the state diagram enumerating allowed transitions between the first state, the second state, the third state, the fourth state, and the fifth state; and
controlling the vehicle based at least in part on the new state.

14. The non-transitory computer-readable medium of claim 13, wherein determining the state comprises evaluating a finite state machine.

15. The non-transitory computer-readable medium of claim 13, wherein the state comprises the first state, the operations further comprising:
receiving sensor data from a sensor associated with the vehicle;
determining, based at least in part on the sensor data, at least one of:
an obstacle in the environment that is blocking the trajectory of the vehicle; or
a cost associated with the obstacle and the trajectory, wherein the cost meets or exceeds a threshold cost; and
based at least in part on one or more of the obstacle, a speed of the vehicle, or the sensor data, causing the vehicle to transition from the first state to one or more of the second state or the fourth state.

16. The non-transitory computer-readable medium of claim 13, wherein the state comprises the third state, the operations further comprising:
determining a distance between a location of the vehicle and the stop location;
determining the period of time associated with the vehicle being stopped; and
causing, based at least in part on one or more of the distance being less than or equal to the threshold distance or the period of time being greater than or equal to the threshold amount of time, the vehicle to transition from the third state to the fourth state.

17. The non-transitory computer-readable medium of claim 14, wherein the state comprises the fourth state, the operations further comprising:
receiving sensor data from a sensor associated with the vehicle;
determining, based at least in part on the sensor data and the sensor, a level of visibility; and
causing, based at least in part on the level of visibility, the vehicle to transition from the fourth state to the fifth state.

18. The non-transitory computer-readable medium of claim 13, wherein the state comprises the fourth state, the operations further comprising:
receiving sensor data from a sensor associated with the vehicle;
determining, based at least in part on the sensor data, an obstacle in the environment which is blocking the trajectory of the vehicle; and
causing, based at least in part on the obstacle, the vehicle to transition from the fourth state to the second state.

19. The non-transitory computer-readable medium of claim 13, wherein the state comprises the second state, the operations further comprising:
- determining, based at least in part on an obstacle in the environment that is blocking the trajectory of the vehicle, the stop location; and
- causing, based at least in part on the stop location, the vehicle to transition from the second state to the third state.

20. The non-transitory computer-readable medium of claim 13, wherein the state comprises the second state, the operations further comprising:
- determining, based at least in part on an obstacle in the environment that is blocking the trajectory of the vehicle, the stop location;
- receiving sensor data from a sensor associated with the vehicle;
- determining, based at least in part on the sensor data, that a distance between an object and the vehicle meets or exceeds a distance threshold; and
- causing the vehicle to transition from the second state to the fourth state.

* * * * *